(12) United States Patent
Ohtsuka et al.

(10) Patent No.: US 7,032,550 B2
(45) Date of Patent: Apr. 25, 2006

(54) INTER-CYLINDER VARIATION DETECTION DEVICE AND INTER-BANK VARIATION DETECTION DEVICE OF INTERNAL COMBUSTION ENGINE

(75) Inventors: Kaoru Ohtsuka, Mishima (JP); Takashi Tsunooka, Susono (JP); Keizo Hiraku, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/528,357

(22) PCT Filed: Jun. 17, 2004

(86) PCT No.: PCT/JP2004/008825

§ 371 (c)(1),
(2), (4) Date: Mar. 18, 2005

(87) PCT Pub. No.: WO2005/008052

PCT Pub. Date: Jan. 27, 2005

(65) Prior Publication Data
US 2005/0247277 A1  Nov. 10, 2005

(30) Foreign Application Priority Data
Jul. 22, 2003  (JP) .............................. 2003-199819

(51) Int. Cl.
*F01L 1/34* (2006.01)
(52) U.S. Cl. .............................. 123/90.16; 123/90.15; 123/345
(58) Field of Classification Search ............. 123/90.15, 123/90.16, 90.17, 90.18, 406.23, 406.32, 123/406.45, 345, 346, 347, 348, 435, 436; 701/103, 104, 110, 111
See application file for complete search history.

(56) References Cited

U.S. PATENT DOCUMENTS

| | | | | |
|---|---|---|---|---|
| 6,425,357 | B1 * | 7/2002 | Shimizu et al. ........... | 123/90.16 |
| 6,615,775 | B1 * | 9/2003 | Takemura et al. ........ | 123/90.15 |
| 2002/0189602 | A1 | 12/2002 | Sugiyama et al. | |

(Continued)

FOREIGN PATENT DOCUMENTS

JP        06-213044        8/1994

(Continued)

*Primary Examiner*—Thomas Denion
*Assistant Examiner*—Ching Chang
(74) *Attorney, Agent, or Firm*—Oliff & Berridge, PLC

(57) ABSTRACT

An inter-bank variation detection device of an internal combustion engine provided with a valve opening characteristic setting means (57) for changing the valve opening characteristic of an intake valve (9) for each of the cylinders (#1 to #4) or each of the bank (BL, BR); an indicator detecting means for detecting indicators of the state of combustion for each bank at the time of a first valve opening characteristic set by the valve opening characteristic setting means and the time of a second valve opening characteristic smaller than the first valve opening characteristic; a fuel injection amount variation detecting means (27) for detecting variation of the fuel injection amount for each bank by using the indicator (Xfn) detected by the indicator detecting means at the time of the first valve opening characteristic; and a valve opening characteristic variation detecting means (27) for detecting variation of the valve opening characteristic for each bank by using the indicator (Xsn) detected by the indicator detecting means at the time of the second valve opening characteristic and the variation of the fuel injection amount detected by the fuel injection amount variation detecting means is provided. It is also possible to change the valve opening characteristic of the intake valve by the valve opening characteristic setting means so that the variation of valve opening characteristic for each cylinder or each bank is eliminated.

16 Claims, 22 Drawing Sheets

FOREIGN PATENT DOCUMENTS

| | | |
|---|---|---|
| JP | 2002-155779 | 5/2002 |
| JP | 2002-371891 | 12/2002 |
| JP | 2003-148182 | 5/2003 |

* cited by examiner

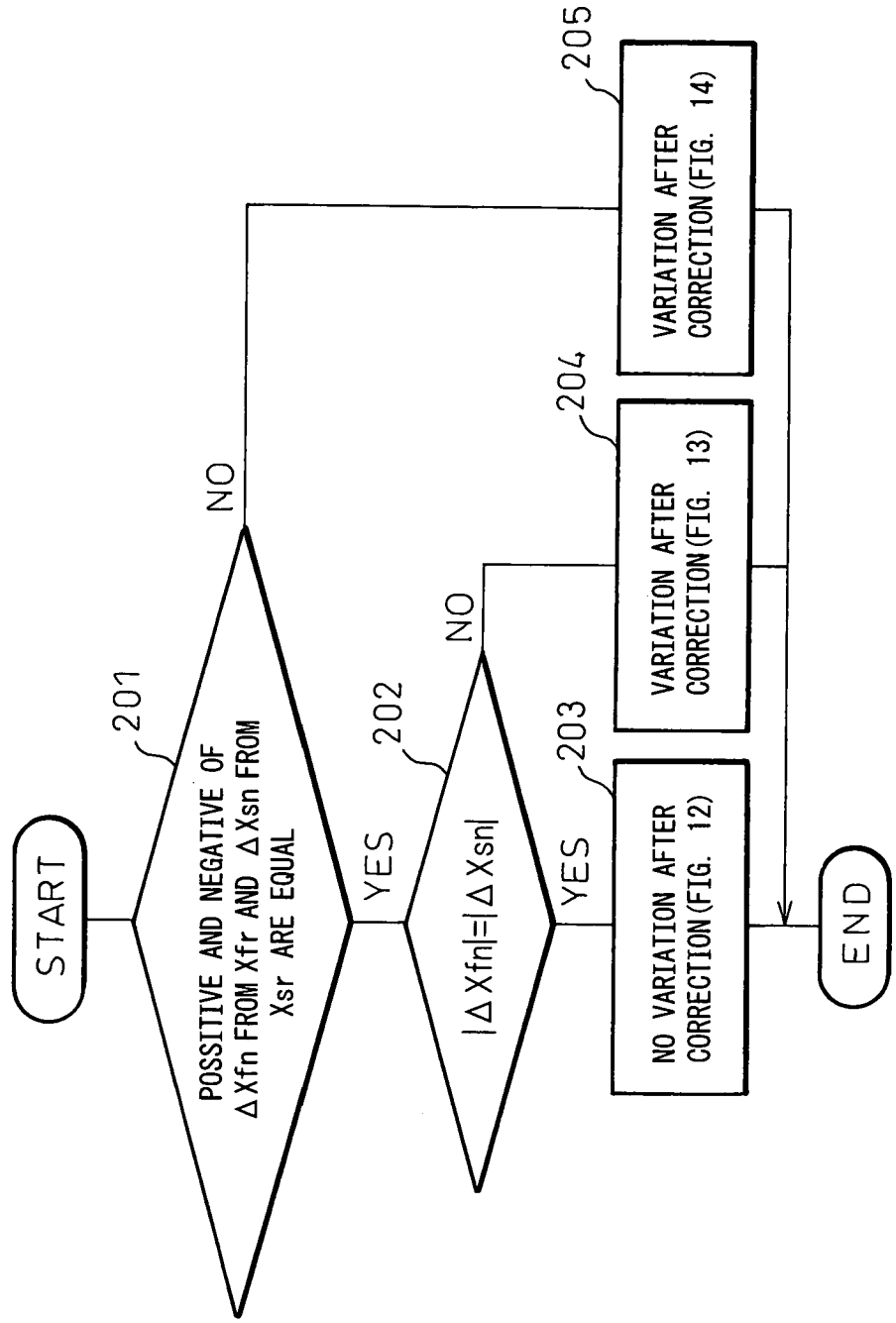

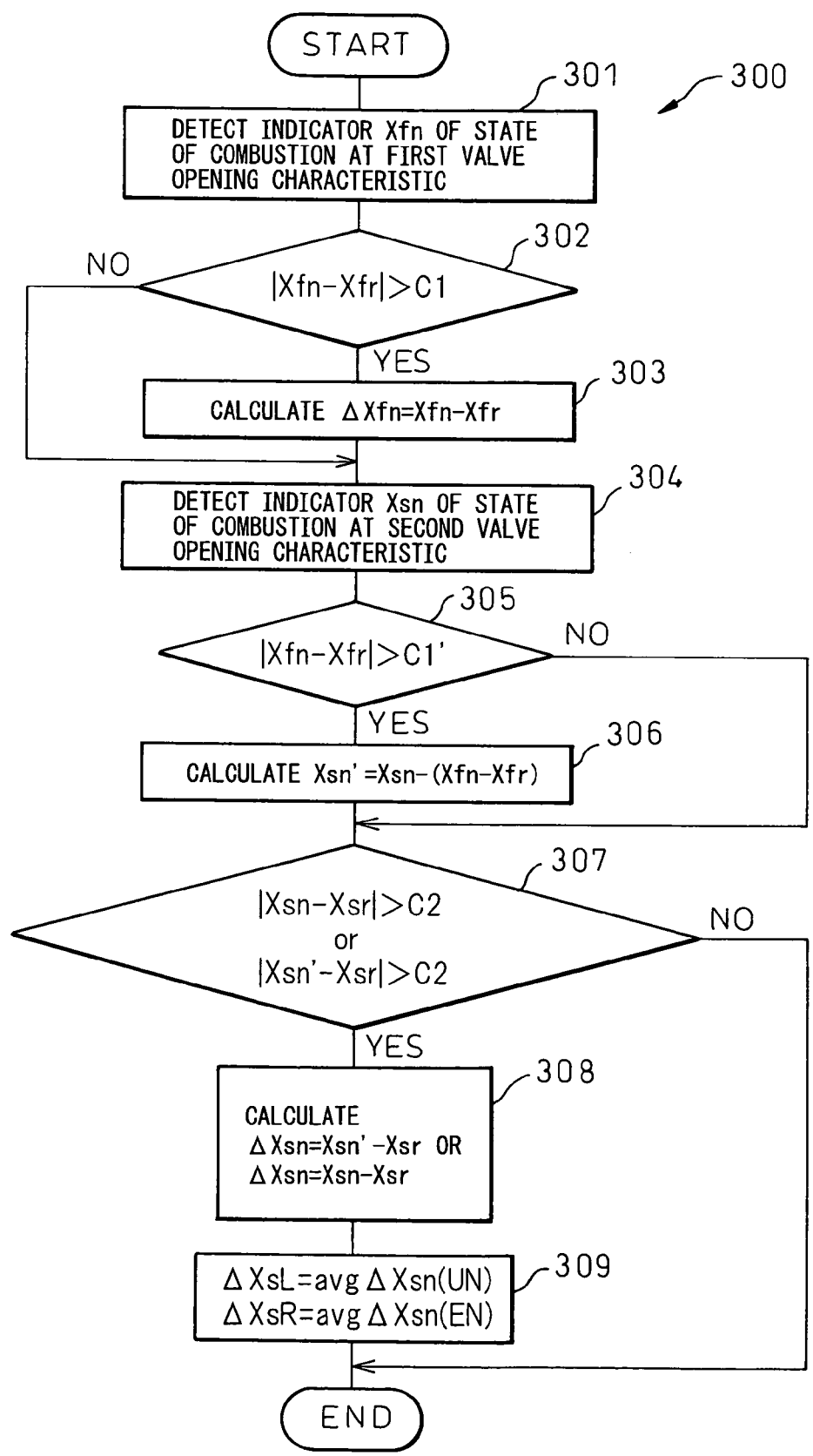

INTER-CYLINDER VARIATION DETECTION DEVICE AND INTER-BANK VARIATION DETECTION DEVICE OF INTERNAL COMBUSTION ENGINE

TECHNICAL FIELD

The present invention relates to an inter-cylinder variation detection device and an inter-bank variation detection device of an internal combustion engine for detecting variation of valve opening characteristics, for example, the operating angle and/or amount of lift, and the variation of fuel injection amount among cylinders of an internal combustion engine, particularly an internal combustion engine provided with a valve opening characteristic setting means for changing the amounts of air flowing into the cylinders.

BACKGROUND ART

In recent years, progress has been made in development of a valve opening characteristic control device making the valve opening characteristics, including the operating angle and/or amount of lift, of intake valves provided in a plurality of cylinders variable so as to control the amount of intake of an internal combustion engine. For example, the internal combustion engine disclosed in Japanese Unexamined Patent Publication (Kokai) No. 2002-155779 sets the operating angle and/or amount of lift relatively small so as to reduce pump loss from that of a conventional internal combustion engine and, at the same time, improve the mileage.

Both in the above-mentioned internal combustion engine provided with a valve opening characteristic control device for changing the valve opening characteristics and in an internal combustion engine of the prior art, sometimes the operating angle and/or amount of lift among cylinders deviates due to poor tuning or sometimes different amounts of deposits stick to the valves of the cylinders etc. Here, if setting the operating angle and/or amount of lift relatively small by a valve opening characteristic control device in an internal combustion engine provided with a valve opening characteristic control device, the amount of change to the intake air amount due to the poor tuning etc. becomes too great to ignored and consequently sometimes exerts an adverse influence upon the drivability and emission. Accordingly, it is necessary to correctly detect the variation of the valve opening characteristics, including the operating angle and/or amount of lift, among cylinders.

On the other hand, deviation of indicators of the state of combustion among cylinders also includes variation of the fuel injection amount. For this reason, if not considering the inter-cylinder variation of the fuel injection amount, the variation of the valve opening characteristics, including the operating angle and/or amount of lift, cannot be correctly detected. Accordingly, if variation of the fuel injection amount arises among cylinders, it is necessary to detect the variation of the valve opening characteristics after correctly detecting this variation of the fuel injection amount.

The present invention was made in consideration with such a circumstance and has as an object thereof to provide an inter-cylinder variation detection device and an inter-bank variation detection device of an internal combustion engine able to detect the occurrence of variation of the valve opening characteristics and the variation of the fuel injection amount among cylinders.

DISCLOSURE OF THE INVENTION

To attain the above object, according to a first aspect of the invention, there is provided an inter-cylinder variation detection device of an internal combustion engine provided with a valve opening characteristic setting means for changing an operating angle and/or amount of lift of an intake valve, wherein the valve opening characteristic setting means can set a first valve opening characteristic and a second valve opening characteristic having a smaller operating angle or amount of lift than that at the time of the first valve opening characteristic, and further provided with a calculating means for detecting an indicator of the state of combustion in each cylinder at the time of the first valve opening characteristic and the time of the second valve opening characteristic set by said valve opening characteristic setting means and, at the same time, calculating the deviation between these indicators and a standard value for each cylinder and a detecting means for detecting the variation among cylinders by using the deviation for each cylinder at the time of the first valve opening characteristic and the deviation for each cylinder at the time of the, second valve opening characteristic calculated by said calculating means.

Namely, according to the first aspect of the invention, when detecting the variation of the valve opening characteristic, not only the deviation with respect to a standard value calculated at the time of the second valve opening characteristic, but also the deviation with respect to the standard value at the time of the first valve opening characteristic is calculated. In this way, it becomes possible to correctly detect the variation among cylinders by calculating the deviation of each cylinder from indicators of the state of combustion at two different valve opening characteristics and correcting it by using these deviations.

According to a second aspect of the invention, there is provided an inter-cylinder variation detection device of an internal combustion engine provided with a valve opening characteristic setting means for changing an operating angle or amount of lift of an intake valve, wherein the valve opening characteristic setting means can set a first valve opening characteristic and a second valve opening characteristic having a smaller operating angle or amount of lift than that at the time of the first valve opening characteristic, and further provided with a calculating means for detecting an indicator of the state of combustion in each cylinder at the time of the first valve opening characteristic and the time of the second valve opening characteristic set by said valve opening characteristic setting means and, at the same time, calculating the deviation between these indicators and an average value of the indicators of the state of combustion for the cylinders and a detecting means for detecting the variation among cylinders by using the deviation for each cylinder at the time of the first valve opening characteristic and the deviation for each cylinder at the time of the second valve opening characteristic calculated by said calculating means.

Namely, according to the second aspect of the invention, when detecting the variation of the valve opening characteristic, not only the deviation with respect to the average value among cylinders calculated at the time of the second valve opening characteristic, but also the deviation with respect to the average value among cylinders at the time of the first valve opening characteristic is calculated. In this way, by calculating the deviation of each cylinder from indicators of the state of combustion in two different valve opening characteristics and correcting the variation by using these deviations, it becomes possible to correctly detect the variation among cylinders.

According to a third aspect of the invention, there is provided the first or second aspect of the invention wherein the variation of the fuel injection amount is detected by the deviation for each cylinder at the time of the first valve opening characteristic set by said valve opening characteristic setting means, and the variation of the valve opening characteristic is detected by the deviation for each cylinder at the time of said second valve opening characteristic.

Namely, according to the third aspect of the invention, not only the variation of the valve opening characteristic, but also occurrence of variation of the injection amount can be detected.

According to a fourth aspect of the invention, there is provided the third aspect of the invention wherein when detecting the variation of the valve opening characteristic by the deviation for each cylinder at the time of the second valve opening characteristic set by said valve opening characteristic setting means, the amount of variation of the fuel injection amount for each cylinder detected at the time of the first valve opening characteristic is corrected.

Namely, according to the fourth aspect of the invention, it becomes possible to correctly detect the variation of the valve opening characteristic after removal of the variation of the fuel injection amount.

According to a fifth aspect of the invention, there is provided any of the first to fourth aspects of the invention wherein where detecting the variation among cylinders by said detection device, control is performed so that the drive conditions at times of the first and second valve opening characteristics set by said valve opening characteristic setting means become the same.

Namely, in the fifth aspect of the invention, the indicators of the state of combustion are made substantially the same so as to enable variation to be corrected and detected more accurately by making the drive conditions the same. Due to this, actions and effects substantially the same as those of the first to fourth aspects of the invention can be obtained.

According to a sixth aspect of the invention, there is provided the fifth aspect of the invention wherein said drive conditions are the rotational speed and torque.

Namely, according to the sixth aspect of the invention, actions and effects substantially the same as those of the first to fifth aspects of the invention can be obtained.

According to a seventh aspect of the invention, there is provided the fifth or sixth aspect of the invention wherein said detection device detects the variation among cylinders in an idling state of the internal combustion engine.

Namely, according to the seventh aspect of the invention, for the frequency of detection and quality of the detection (fluctuation in rotation detected well), more desirably the variation is detected in the idling state. Due to this, actions and effects substantially the same as those of the first to sixth aspects of the invention can be obtained.

According to an eighth aspect of the invention, there is provided the first or second aspect of the invention wherein said indicator of the state of combustion includes at least one of an air/fuel ratio, rotation fluctuation, and combustion pressure of the internal combustion engine.

Namely, according to the eighth aspect of the invention, existence of variation of the valve opening characteristic and variation of the fuel injection amount can be correctly detected by a relatively simple configuration.

According to a ninth aspect of the invention, there is provided the first or second aspect of the invention wherein the valve opening characteristic of said intake valve is changed so that the variation among cylinders detected by said detecting means is eliminated.

Namely, according to the ninth aspect of the invention, the valve opening characteristic is changed by exactly the amount of the variation of the valve opening characteristic among cylinders detected so as not to include the variation of the fuel injection amount, therefore more precise control becomes possible and it becomes possible to avoid the adverse influence upon the drivability and the emission by that.

According to a 10th aspect of the invention, there is provided an inter-cylinder variation detection device of an internal combustion engine provided with: a valve opening characteristic setting means for changing a valve opening characteristic of an intake valve; an indicator detecting means for detecting indicators of the state of combustion for each cylinder at the time of a first valve opening characteristic and at the time of a second valve opening characteristic smaller than the first valve opening characteristic set by the valve opening characteristic setting means; a fuel injection amount variation detecting means for detecting the variation of the fuel injection amount for each of the cylinders by using said indicator of the state of combustion detected by said indicator detecting means at the time of said first valve opening characteristic; and a valve opening characteristic variation detecting means for detecting variation of the valve opening characteristic for each of said cylinders by using said indicator of the state of combustion detected by said indicator detecting means at the time of said second valve opening characteristic and the variation of the fuel injection amount detected by said fuel injection amount variation detecting means.

Namely, according to the 10th aspect of the invention, the variation of the fuel injection amount for each cylinder is detected from the indicator of the state of combustion at the time of the first valve opening characteristic, and the variation of the fuel injection amount is not included from the indicator of the state of combustion at the time of the second valve opening characteristic, so it becomes possible to correctly detect the variation of the valve opening characteristic for each cylinder.

According to an 11th aspect of the invention, there is provided the 10th aspect of the invention wherein said valve opening characteristic setting means can change the valve opening characteristic of the intake valve for each cylinder, and the variation of the valve opening characteristic for each of said cylinders detected by said valve opening characteristic variation detecting means is eliminated by the valve opening characteristic of said intake valve for each of said cylinders being changed by said valve opening characteristic setting means.

Namely, according to the 11th aspect of the invention, the valve opening characteristic is changed by exactly the amount of the variation of the valve opening characteristic among cylinders detected so as not to include the variation of the fuel injection amount, therefore more precise control becomes possible, and it becomes possible to avoid an adverse influence upon the drivability and the emission by that.

According to a 12th aspect of the invention, there is provided the 10th or 11th aspect of the invention wherein said indicator of the state of combustion includes at least one of the air/fuel ratio, the rotation fluctuation, and the combustion pressure of the internal combustion engine.

Namely, according to the 12th aspect of the invention, the existence of variation of the valve opening characteristic and variation of the fuel injection amount can be correctly detected by a relatively simple configuration.

According to a 13th aspect of the invention, there is provided an inter-bank variation detection device of an internal combustion engine provided with: a valve opening characteristic setting means for changing a valve opening characteristic of an intake valve for each bank; an indicator detecting means for detecting indicators of the state of combustion for each cylinder at the time of a first valve opening characteristic and at the time of a second valve opening characteristic smaller than the first valve opening characteristic set by the valve opening characteristic setting means; a fuel injection amount variation detecting means for detecting the variation of the fuel injection amount for each of said cylinders by using said indicator of the state of combustion detected by said indicator detecting means at the time of said first valve opening characteristic; and a valve opening characteristic variation detecting means for detecting the variation of the valve opening characteristic for each of said cylinders by using said indicator of the state of combustion detected by said indicator detecting means at the time of said second valve opening characteristic and the variation of the fuel injection amount detected by said fuel injection amount variation detecting means and finding the average of the variations of the valve opening characteristics for the cylinders for each bank to thereby detect the variation of the valve opening characteristic for each bank.

Namely, according to the 13th aspect of the invention, the variation of the fuel injection amount for each cylinder is detected from the indicator of the state of combustion at the time of the first valve opening characteristic, and the variation of the valve opening characteristic for each cylinder is detected from the indicator of the state of combustion at the time of the second valve opening characteristic so as not to include the variation of the fuel injection amount, therefore, by finding the average of the variations of the valve opening characteristics for the cylinders for each bank, it becomes possible to correctly detect the variation of the valve opening characteristic among banks.

According to a 14th aspect of the invention, there is provided an inter-bank variation detection device of an internal combustion engine provided with: a valve opening characteristic setting means for changing a valve opening characteristic of an intake valve for each bank; an indicator detecting means for detecting indicators of the state of combustion for each bank at the time of a first valve opening characteristic and at the time of a second valve opening characteristic smaller than the first valve opening characteristic set by the valve opening characteristic setting means; a fuel injection amount variation detecting means for detecting the variation of the fuel injection amount for each bank by using said indicator of the state of combustion detected by said indicator detecting means at the time of said first valve opening characteristic; and a valve opening characteristic variation detecting means for detecting the variation of the valve opening characteristic for each bank by using said indicator of the state of combustion detected by said indicator detecting means at the time of said second valve opening characteristic and the variation of the fuel injection amount detected by said fuel injection amount variation detecting means.

Namely, according to the 14th aspect of the invention, the variation of the fuel injection amount for each bank is detected from the indicator of the state of combustion at the time of the first valve opening characteristic, and the variation of the valve opening characteristic for each bank is detected from the indicator of the state of combustion at the time of the second valve opening characteristic so as not to include the variation of the fuel injection amount, therefore, it becomes possible to correctly detect the variation of the valve opening characteristic for each bank.

According to a 15th aspect of the invention, there is provided the 13th or 14th aspect of the invention wherein the valve opening characteristic of said intake valve for each bank is changed by said valve opening characteristic setting means so that the variation of the valve opening characteristic of each bank detected by said valve opening characteristic variation detecting means is eliminated.

Namely, according to the 15th aspect of the invention, the valve opening characteristic is changed by exactly the amount of the variation of the valve opening characteristic among banks detected so as not to include the variation of the fuel injection amount, therefore more precise control becomes possible, and it becomes possible to avoid the adverse influence upon the drivability and the emission by that.

According to a 16th aspect of the invention, there is provided the 13th or 14th aspect of the invention wherein said indicator of the state of combustion includes at least one of the air/fuel ratio, the rotation fluctuation, and the combustion pressure of the internal combustion engine.

Namely, according to the 16th aspect of the invention, existence of variation of the valve opening characteristic and variation of the fuel injection amount can be correctly detected by a relatively simple configuration.

BRIEF DESCRIPTION OF THE DRAWINGS

FIG. 11 is a flowchart for explaining three further patterns when it is judged as YES at step 102 of FIG. 5.

FIG. 17 is a view of a flowchart of a program for the operation of the variation detection device among banks of the internal combustion engine shown in FIG. 15 and FIG. 16.

BEST MODE FOR CARRYING OUT THE INVENTION

Below, an explanation will be given of embodiments of the present invention by referring to the attached drawings. In the following drawings, the same notations are attached to the same members. For facilitating understanding, these drawings are appropriately changed in scale of reduction.

Figure 1:
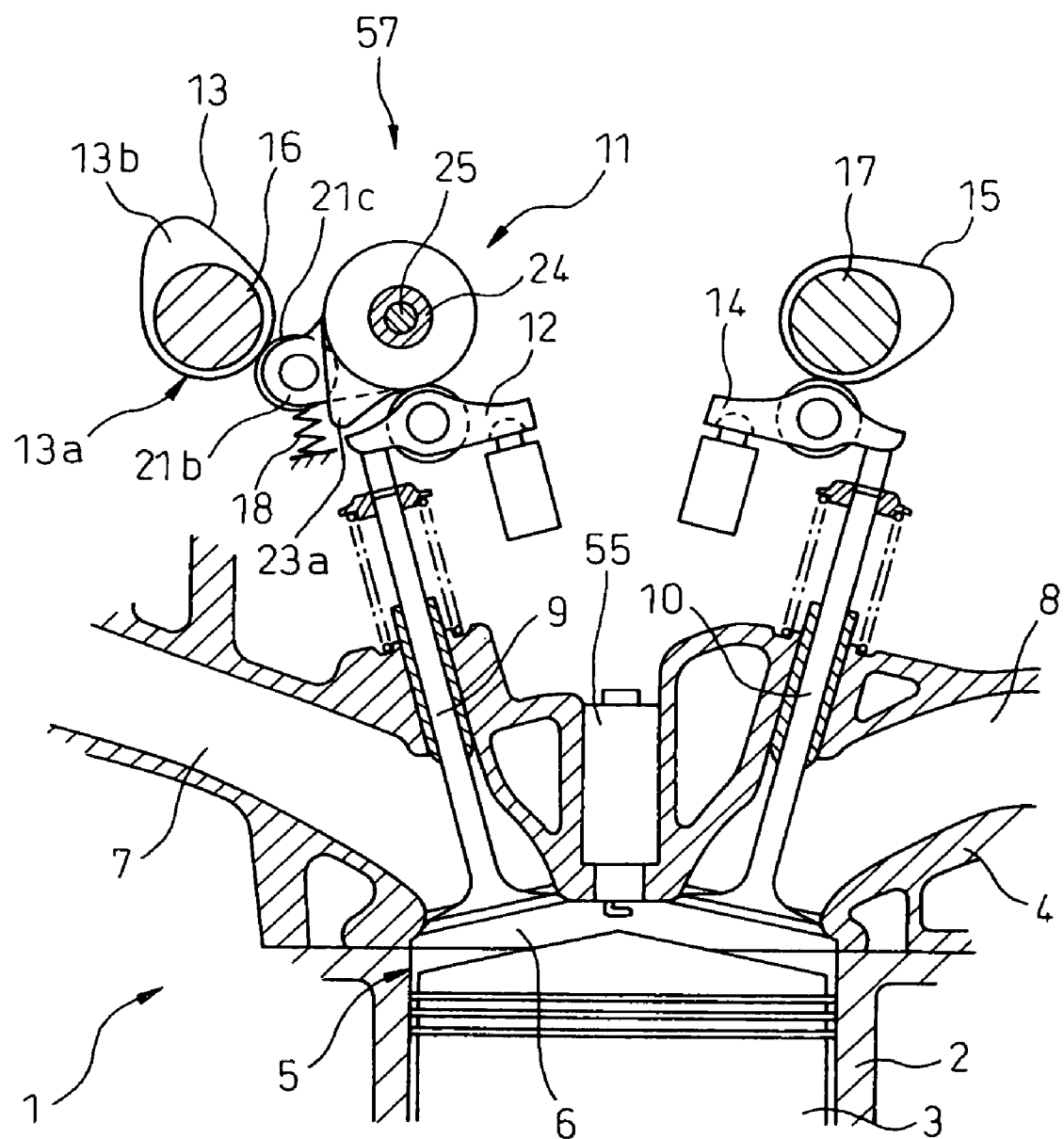
FIG. 1 is a sectional view of a spark ignition type internal combustion engine having a valve opening characteristic control device of the present invention mounted thereon.
Figure 2:
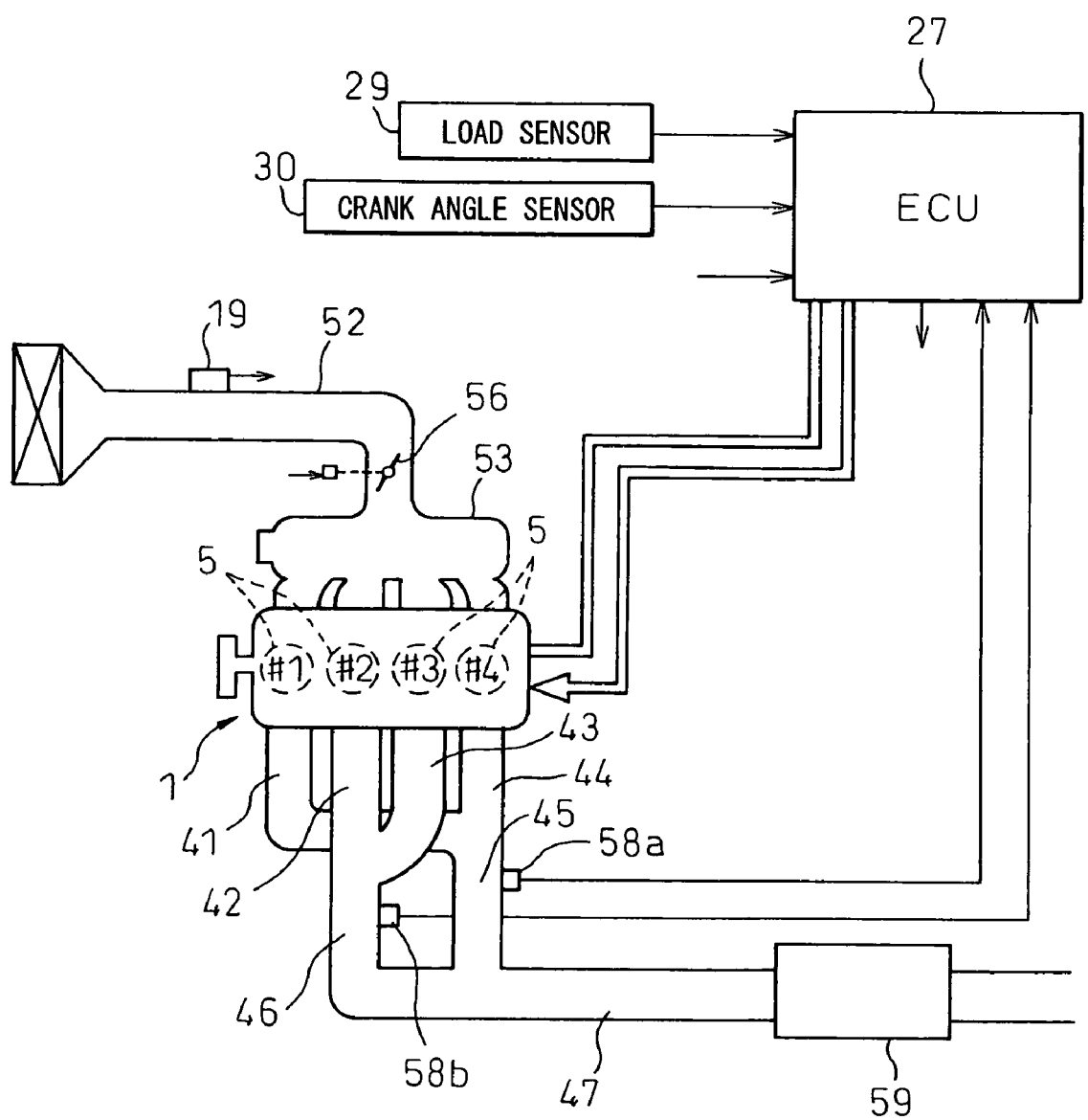
FIG. 2 is a schematic view of the configuration including an intake system etc. of the internal combustion engine shown in FIG. 1.

FIG. 1 is a sectional view of a spark-ignition type internal combustion engine having an inter-cylinder variation detection device of the present invention mounted thereon, and FIG. 2 is a schematic view of the configuration including an intake system etc. of the internal combustion engine shown in FIG. 1. Note that the inter-cylinder variation detection device of the present invention can also be mounted on an in-cylinder injection type spark-ignition type internal combustion engine and a compression self ignition type diesel internal combustion engine.

Referring to FIG. 1 and FIG. 2, an engine body 1 is provided with a cylinder block 2, a piston 3 reciprocally moving in this cylinder block 2, and a cylinder head 4 attached onto the cylinder block 2. Further, the cylinder head 4 is provided with a spark plug 55. In the cylinder block 2, as will be mentioned later, four cylinders 5 are formed. In each cylinder 5, a combustion chamber 6 defined by the cylinder block 2, the piston 3, and the cylinder head 4 is formed.

Each combustion chamber 6 is communicated to an intake port 7 and an exhaust port 8 formed in the cylinder head 4. An intake valve 9 is arranged between the combustion chamber 6 and the intake port 7. The intake valve 9 opens or closes a flow passageway between the combustion chamber 6 and the intake port 7. On the other hand, an exhaust valve 10 is arranged between the combustion chamber 6 and the exhaust port 8. The exhaust valve 10 opens or closes the flow passageway between the combustion chamber 6 and the exhaust port 8. The intake valve 9 is lifted by an intake cam 13 via an intermediate drive mechanism 11 and a rocker arm 12 mentioned later, and the exhaust valve 10 is lifted by an exhaust cam 15 via a rocker arm 14. The intake cam 13 is attached to an intake cam shaft 16, while the exhaust cam 15 is attached to an exhaust cam shaft 17.

An electronic control unit (ECU) 27 is configured by a microcomputer having a known configuration comprised of a read only memory (ROM), a random access memory (RAM), a microprocessor (CPU), input ports, and output ports connected to each other by a bi-directional bus. The ECU 27 has connected to it an air flow meter 19 and also various types of sensors such as a load sensor 29 for generating an output voltage proportional to an amount of depression of an accelerator pedal (hereinafter referred to as an "accelerator depression amount") and a crank angle sensor 30 for generating an output pulse whenever the crank shaft rotates by for example 30°. Further, it is connected to the spark plug 55 and a fuel injection valve (not illustrated) and a throttle valve 56 etc. and controls their operations. In the present embodiment, the opening degree of the throttle valve 56 can be changed regardless of the accelerator depression amount. By adjusting the opening degree of the throttle valve, the intake air pressure is controlled. Further, the ECU 27 also transfers signals with a valve opening characteristic control device 57 configured by including the intermediate drive mechanism 11 as will be mentioned later and controls the valve opening characteristic control device 57 and also controls the operating angle and the amount of lift as the valve opening characteristics of the intake valve 9. Note that, in FIG. 2, 52 indicates an intake pipe, and 53 indicates a surge tank.

As shown in FIG. 2, the internal combustion engine 1 in the present embodiment has four cylinders. As exhaust passageways thereof, first an exhaust passageway 41 from the first cylinder (#1) and an exhaust passageway 44 from the fourth cylinder (#4) and an exhaust passageway 42 from the second cylinder (#2) and an exhaust passageway 43 from the third cylinder (#3) are combined to form two exhaust passageways 45 and 46, then these are combined to form one exhaust passageway 47. Then, at the portion where the exhaust passageway 41 from the first cylinder and the exhaust passageway 44 from the fourth cylinder are combined, that is, at one exhaust passageway 45 of the two exhaust passageways 45 and 46, a first air/fuel ratio sensor 58a is provided. In the same way as above, at the portion where the exhaust passageway 42 from the second cylinder and the exhaust passageway 43 from the third cylinder are combined, that is, at one exhaust passageway 46 of the two exhaust passageways 45 and 46, a second air/fuel ratio sensor 58b is provided. These air/fuel ratio sensors 58a and 58b are connected to the ECU 27, whereby the information of the detected air/fuel ratios is supplied to the ECU 27. Further, the portion 47 at which the exhaust passageways are combined is provided with an exhaust purification device 59.

Figure 3:
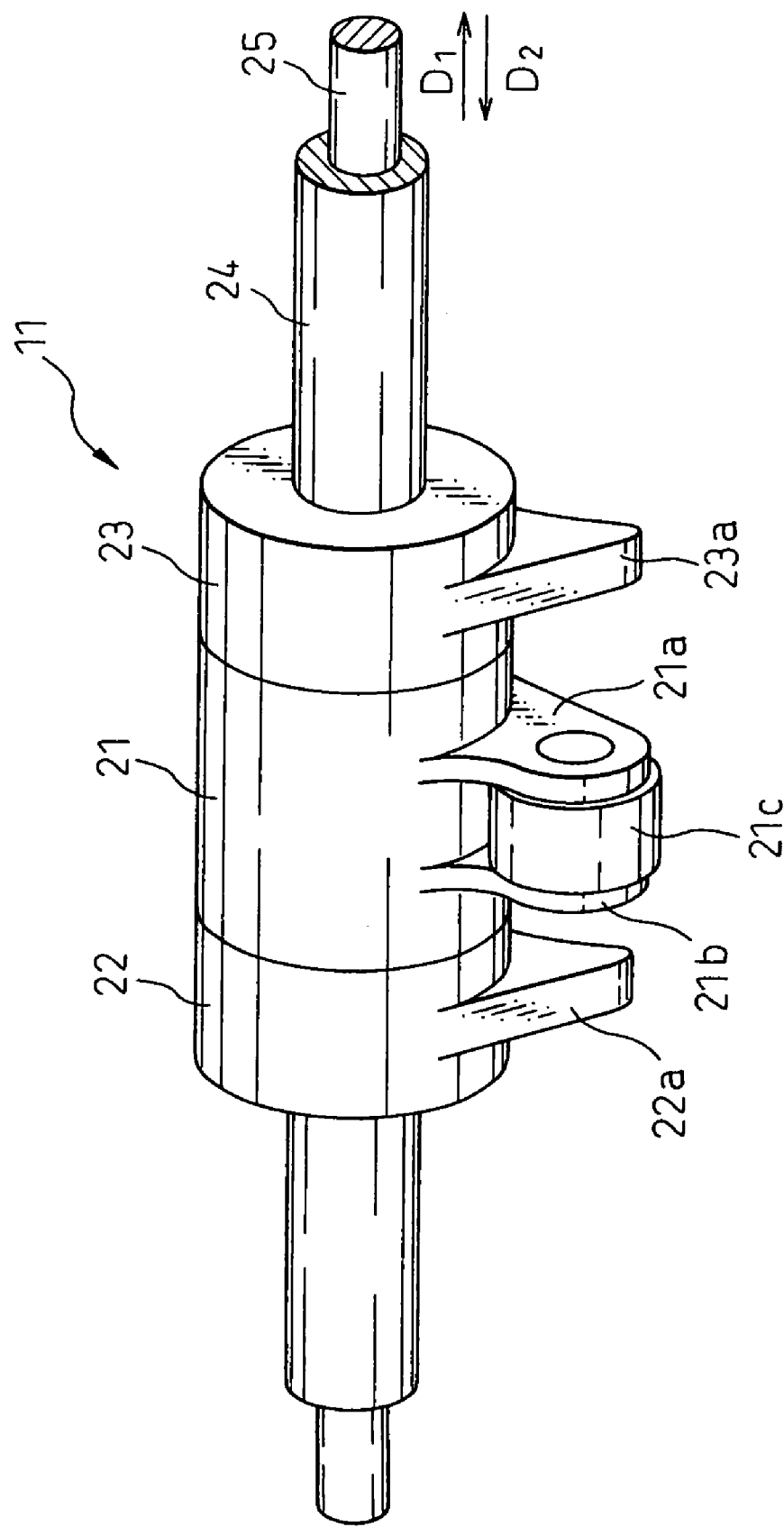
FIG. 3 is a perspective view of an intermediate drive mechanism.
Figure 4:
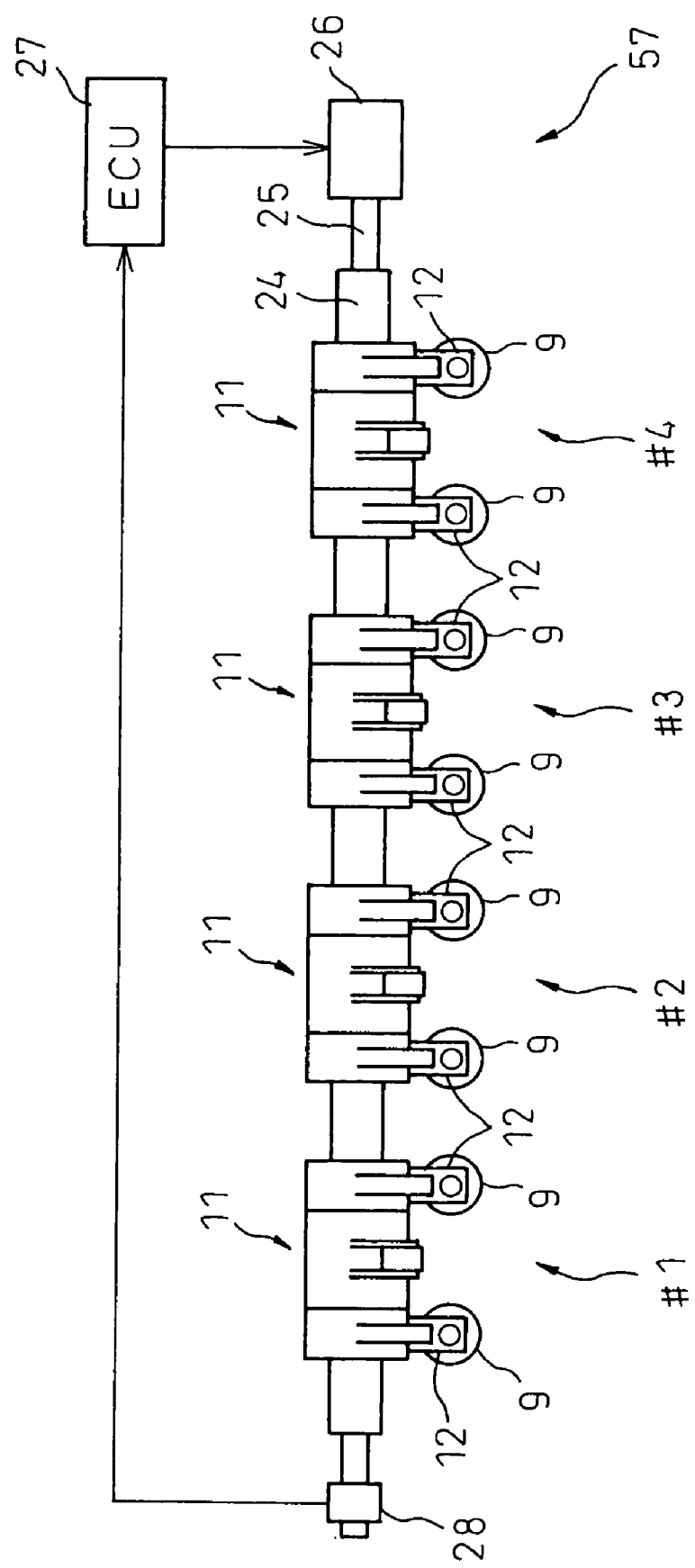
FIG. 4 is an explanatory view of the schematic configuration of a valve opening characteristic control device.

Next, referring to FIG. 3 and FIG. 4, an explanation will be given of the intermediate drive mechanism 11 and the valve opening characteristic control device 57 configured including that. FIG. 3 is a perspective view of the intermediate drive mechanism 11, and FIG. 4 is an explanatory view of the schematic configuration of the valve opening characteristic control device 57. Here, the intermediate drive mechanism 11 has the same configuration as the intermediate drive mechanism disclosed in Japanese Unexamined Patent Publication (Kokai) No. 2001-263015 and is already known as a so-called "rocking cam mechanism", so will be just simply explained below. The intermediate drive mechanism 11 shown in FIG. 3 is provided for each cylinder of the internal combustion engine. Accordingly, in the present embodiment, which is the case of a four-cylinder internal combustion engine, four intermediate drive mechanisms 11 are provided.

The intermediate drive mechanism 11 is provided with a cylindrical input portion 21, a cylindrical first rocking cam 22 arranged at one side of the input portion 21 in an axial direction of this input portion 21, and a cylindrical second rocking cam 23 arranged at the opposite side to the above one side of the input portion 21 in the axial direction of the input portion 21. The input portion 21 and the rocking cams 22 and 23 have cylindrical through holes extending in the axial direction centered about the axial lines thereof. A support pipe 24 passes through these through holes. The input portion 21 and the rocking cams 22 and 23 are supported by the support pipe 24 and can pivot about the support pipe 24. The support pipe 24 is fixed to a cylinder head 4. Further, the support pipe 24 has a cylindrical through hole extending in the axial direction centered about the axial line thereof. A control shaft 25 passes through this through hole. The control shaft 25 can slide in the axial direction of the support pipe 24 in the through hole of the support pipe 24.

Arms 21a and 21b are extended from the outer circumferential surface of the input portion 21 toward the diameter direction of the input portion 21. A roller 21c is arranged between front ends of these arms 21a and 21b. The roller 21c abuts against a cam surface 13a of the intake cam 13 as shown in FIG. 1, so that the input portion 21 pivots around the support pipe 24 in accordance with the shape of the cam surface 13a. On the other hand, from the outer circumferential surfaces of the rocking cams 22 and 23, noses 22a and 23a extend toward the diameter direction of the rocking cams 22 and 23. These noses 22a and 23a can abut against the rocker arm 12.

Further, the input portion 21 and the rocking cams 22 and 23 and the control shaft 25 are connected by a constant control mechanism (not illustrated). This control mechanism is configured so as to pivot the input portion 21 and the rocking cams 22 and 23 in opposite directions to each other when the control shaft 25 is relatively moved with respect to the support pipe 24. Especially, in the present embodiment, when the control shaft 25 is moved in a direction $D_1$ with respect to the support pipe 24, the input portion 21 and the rocking cams 22 and 23 pivot so that the relative angles between the roller 21c of the input portion 21 and the noses 22a and 23a of the rocking cams 22 and 23 become large, while when the control shaft 25 is moved in a direction $D_2$ opposite to the direction $D_1$ with respect to the support pipe 24, the input portion 21 and the rocking cams 22 and 23 pivot so that relative angles between the roller 21c of the input portion 21 and the noses 22a and 23a of the rocking cams 22 and 23 become small. When the relative angles between the roller 21c and the noses 22a and 23a become large, the distances between the roller 21c and the noses 22a and 23a become long, while conversely when the relative angles between the roller 21c and the noses 22a and 23a become small, the distances between the roller 21c and the noses 22a and 23a become short.

On the other hand, as seen from FIG. 1, the amount of the lift of the intake valve 9 by the intake cam 13 changes according to the distances between the roller 21c and the noses 22a and 23a. Namely, if the distances between the roller 21c and the noses 22a and 23a become long, when the roller 21c abuts against a peak 13b of the intake cam 13, the period where the noses 22a and 23a lift the intake valve 9 becomes long and, at the same time, the amount of lift becomes large. Conversely, if the distances between the roller 21c and the noses 22a and 23a become short, when the roller 21c abuts against the peak 13b of the intake cam 13, the period where the noses 22a and 23a lift the intake valve 9 becomes short and, at the same time, the amount of lift becomes small. Namely, when the distances between the roller 21c and the noses 22a and 23a become long, the operating angle of the intake valve 9 becomes large and, at the same time, the amount of lift of the intake valve 9 becomes large, while when the distances between the roller 21c and the noses 22a and 23a become short, the operating angle of the intake valve 9 becomes small and, at the same time, the amount of lift of the intake valve 9 becomes small.

Accordingly, in the intermediate drive mechanism 11, when the control shaft 25 is moved in the first direction $D_1$, the operating angle of the intake valve 9 becomes large and, at the same time, the amount of lift of the intake valve 9 becomes large, while when the control shaft 25 is moved in the second direction $D_2$, the operating angle of the intake valve 9 becomes small and, at the same time, the amount of lift of the intake valve 9 becomes small. Note that, in the present embodiment, the operating angle and the amount of lift used as the valve opening characteristics have constant relationships in this way, but in other embodiments, it is also possible even if only the operating angle or only the amount of lift is changed as the valve opening characteristic.

As mentioned above, the present embodiment relates to the case of a four-cylinder internal combustion engine, so has four of the intermediate drive mechanisms 11. The four intermediate drive mechanisms 11 are arranged in series as shown in FIG. 4. All of the intermediate drive mechanisms 11 are provided on one support pipe 24 and one control shaft 25. Accordingly, when the valve opening characteristic control device 57 normally operates, the same valve opening characteristics can be obtained in all cylinders.

As shown in FIG. 4, an electric actuator 26 is connected to one end portion of the control shaft 25. The position of the control shaft 25 can be controlled by this actuator 26. This electric actuator 26 is connected to the ECU 27 and controlled by this. That is, in the present embodiment, the electric actuator 26 can be controlled by the ECU 27 so as to move the position of the control shaft 25 in the axial direction thereof. The distances between the roller 21c and the noses 22a and 23a are changed by this, thus the operating angle and amount of lift used as the valve opening characteristics of the intake valve 9 can be continuously controlled.

In the vicinity of the other end portion of the control shaft 25, a position sensor 28 for detecting the position of the control shaft 25 in the axial direction is arranged. The position of the control shaft 25 can be detected by this position sensor 28. This position sensor 28 is connected to the ECU 27, whereby the information of the position of the control shaft 25 detected by the position sensor 28 is supplied to the ECU 27. Note that, as mentioned above, in the present embodiment, the distances between the roller 21c and the noses 22a and 23a are changed by controlling the position of the control shaft 25, and the operating angle and the amount of lift used as the valve opening characteristics of the intake valve 9 are controlled by this, therefore it can be said that the position sensor 28 is a valve opening characteristic sensor detecting the valve opening characteristic.

In the internal combustion engine of the present embodiment, in the configuration described above, various types of control such as fuel injection amount control, ignition timing control, and intake amount control are executed by the ECU 27 based on signals from various sensors. Especially, the intake amount control is carried out by the ECU 27 controlling both of the valve opening characteristic control device 57 and the throttle valve 56 in more detail. Namely, in the present embodiment, the operating angle and the amount of lift used as the valve opening characteristics of the intake valve 9 can be continuously controlled by the valve opening characteristic control device 57, and the intake pressure can be controlled by the throttle valve 56, therefore usually the intake amount is controlled by jointly controlling the valve opening characteristics (amount of lift and operating angle) and the intake pressure.

Figure 5:
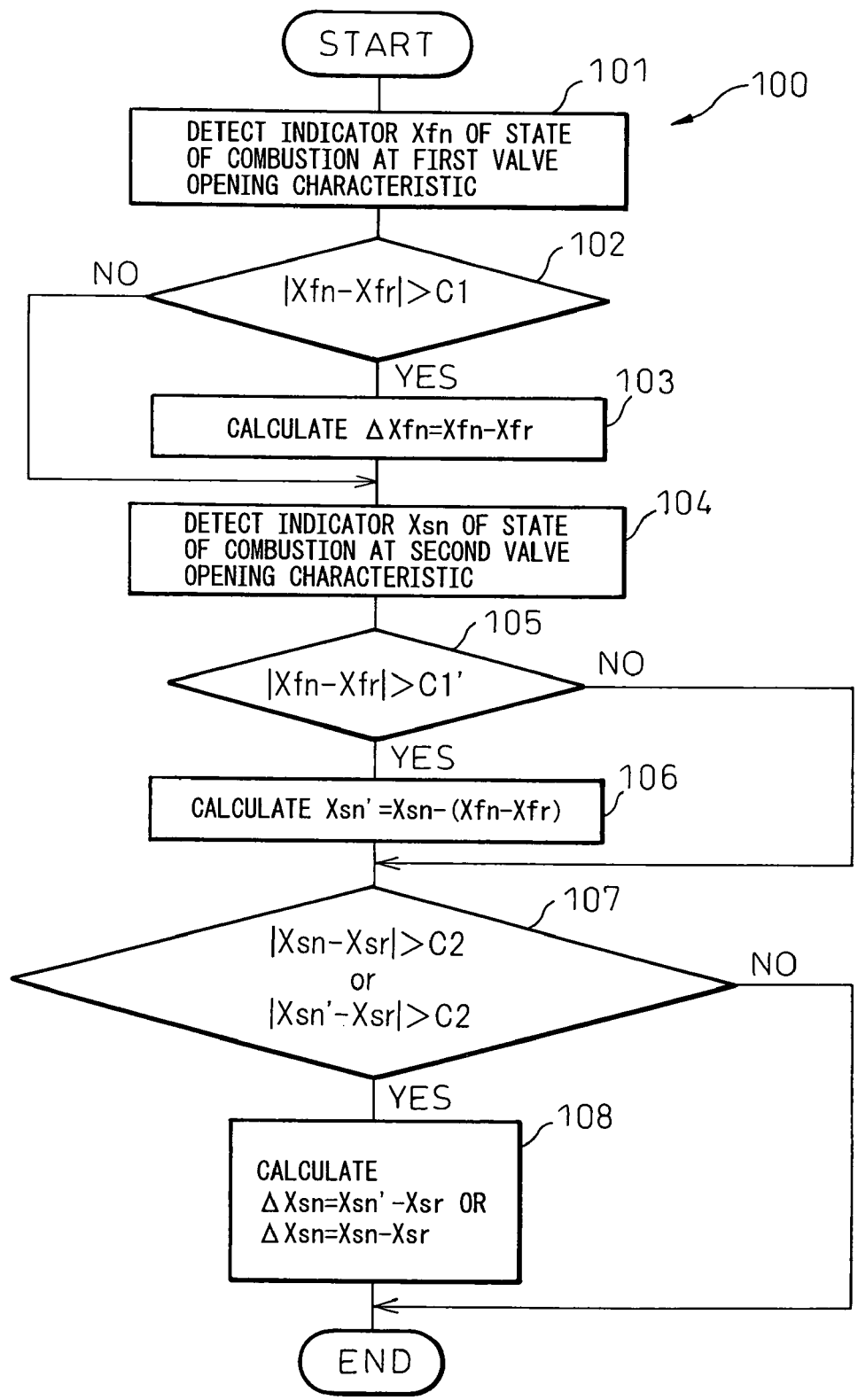
FIG. 5 is a view of a flowchart of a program for operating an inter-cylinder variation detection device in the present invention.

FIG. 5 is a view of a flowchart of a program for the operation of the inter-cylinder variation detection device of the internal combustion engine in the present invention. A program 100 shown in FIG. 5 is executed by the ECU 27 in the case of normal operation where the intake amount becomes constant, for example, at the time of idling after warmup. At step 101 of the program 100, the indicator of the state of combustion when the valve opening characteristic is set a first valve opening characteristic (hereinafter referred to as "the first valve opening characteristic"), that is, an indicator fluctuating in relation to the state of combustion (hereinafter referred to as the "indicator of the state of combustion" or the "indicator") Xfn, is detected for each cylinder (hereinafter, the indicator of the state of combustion of the first cylinder at the first valve opening characteristic will be indicated as "Xf1", and indicators of the second, third, and fourth cylinders will be indicated as "Xf2", "Xf3", and "Xf4" and, further, where these are indicated together, indicated as "Xfn"). For this first valve opening characteristic, the case where the operating angle and/or amount of lift is relatively large and the variation of the valve opening characteristics is small enough to ignore is selected. Accordingly, at the time of the first valve opening characteristic, the intake amount becomes relatively large. Note that the case of an embodiment controlling only one of the operating angle and amount of lift by the valve opening characteristic control device is made a case where the operating angle or amount of lift is relatively large.

Here, an explanation will be given of the indicator of the state of combustion. FIG. 6a and FIG. 6b and FIG. 7a and FIG. 7b are views for explaining examples of the indicator of the state of combustion in the present invention. In these drawings, the fluctuation of the engine speed, the time required for the rotation by a crank angle of 90° (hereinafter referred to as "T90"), the exhaust air/fuel ratio (hereinafter appropriately referred to as "A/F"), and the cylinder pressure are shown.

Figure 6A:
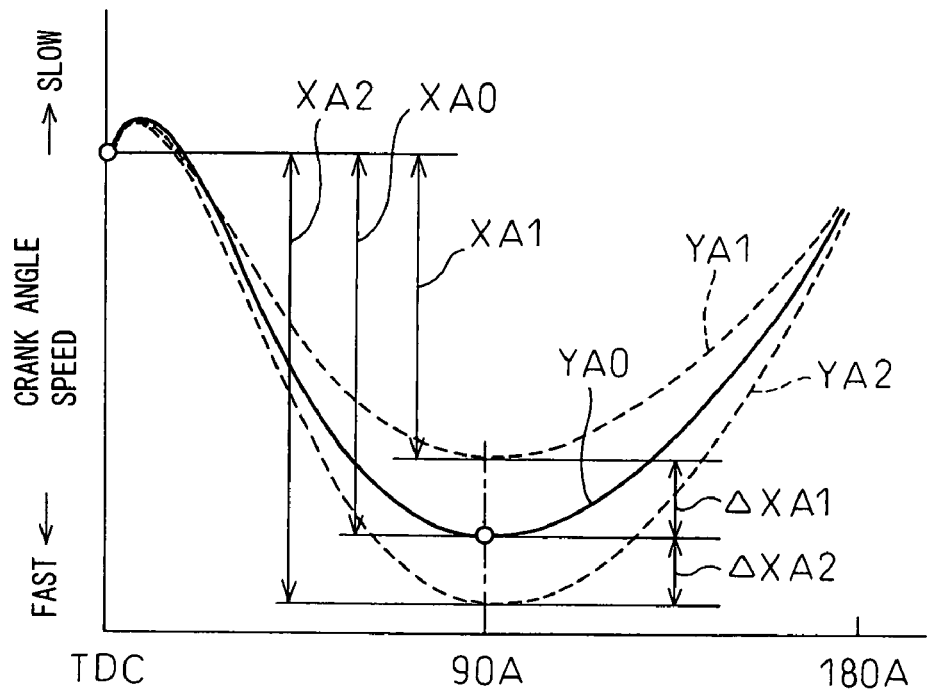
FIG. 6a is a view for explaining an example of an indicator of the state of combustion in the present invention and shows a crank angle speed.

First, an explanation will be given of the case where the fluctuation of the engine speed is made the indicator of the state of combustion as shown in FIG. 6a. For the fluctuation of the engine speed, the change of the engine speed along with time is found based on the signal from the crank angle sensor 30. Therefore, by analyzing this by the relationship with the crank angle, the fluctuation of the rotation speed corresponding to the explosion in each cylinder (for example the difference between the rotational speed of the engine immediately before the ignition in each cylinder and the peak rotational speed after the ignition) can be found. Then, this value can be used as the fluctuation of the engine speed corresponding to each cylinder. In FIG. 6a, an ordinate indicates the crank angle speed, and an abscissan indicates the crank angle from top dead center TDC. A solid line YA0 shown in FIG. 6a indicates the crank angle speed at the time of normal operation, while the two dotted lines YA1 and YA2 indicate crank angle speeds where the crank angle is deviated to the retarded side and advanced side from that at the time of normal operation. As shown in FIG. 6a, the displacements of the crank angle speed from top dead center TDC to 90° of the solid line YA0 and the dotted lines YA1 and YA2 are indicated as the engine speed fluctuations XA0, XA1, and XA2. Here, XA0 corresponds to the standard value X mentioned later. Further, the difference between the engine speed fluctuation XA0 at the time of normal operation and the engine speed fluctuation XA1 when the crank angle is at the retarded side is indicated by $\Delta XA1$, and the difference between the engine speed fluctuation XA0 at the time of normal operation and the engine speed fluctuation XA2 when the crank angle is at the advanced side is indicated by $\Delta XA2$. When the fluctuation of the engine speed is employed as the indicator of the state of combustion, the indicator Xfn at step 101 of FIG. 5 corresponds to XA1 and XA2 in FIG. 6a. Further, the indicator Xsn where the valve opening characteristic at step 104 mentioned later is changed also corresponds to XA1 and XA2 in FIG. 6a.

Figure 6B:
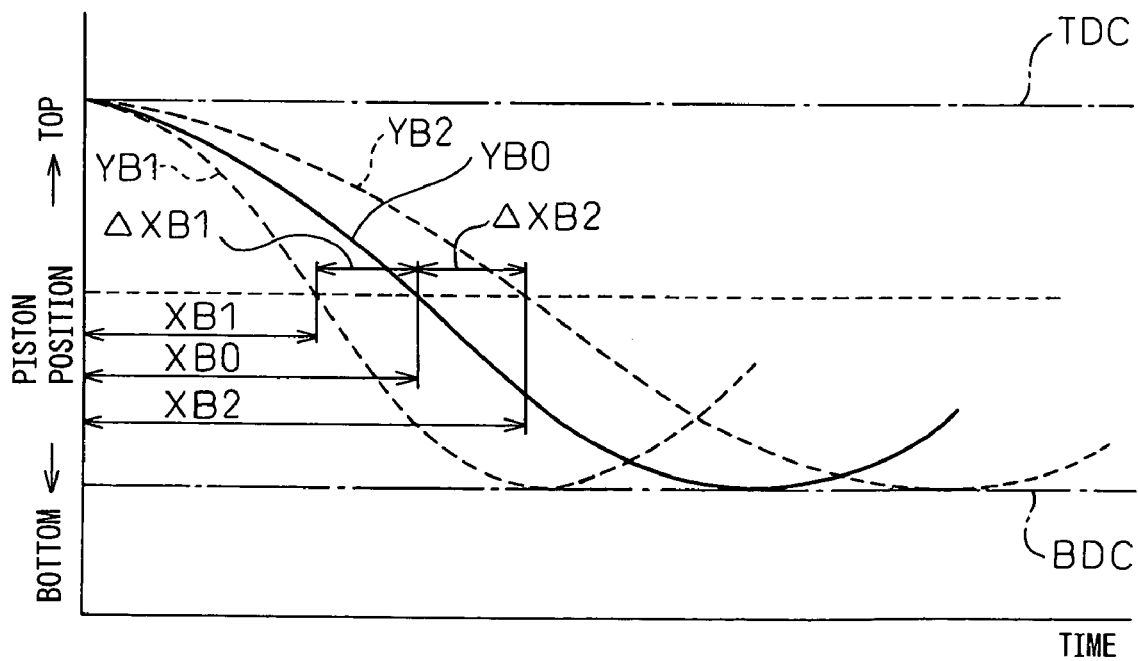
FIG. 6b is a view for explaining an example of an indicator of the state of combustion in the present invention and shows the time required for rotation by a crank angle of 90°.

In the same way as above, as shown in FIG. 6b, an explanation will be given of the case where the time T90 required for rotation by a crank angle of 90° is employed as the indicator of the state of combustion. The T90 is calculated at the ECU 27 from the crank angles obtained by the crank angle sensor 30 shown in FIG. 2. In FIG. 6b, the ordinate indicates the position of the piston 3. The top dead center TDC and the bottom dead center BDC are indicated by one-dot-chain lines. The abscissa of FIG. 6b indicates the time from the top dead center TDC. The solid line YB0 shown in FIG. 6b indicates the position of the piston 3 at normal operation, while the two dotted lines YB1 and YB2 indicate positions of the piston 3 when it is deviated to the retarded side and the advanced side from the time of normal operation. In FIG. 6b, at the center between the top dead center TDC and the bottom dead center BDC, the position of the piston 3 at the crank angle 90° from the top dead center TDC is indicated by the dotted line. As shown in FIG. 6b, the displacements T90 from the top dead center TDC to 90° of the solid line YB0 and the dotted lines YB1 and YB2 are indicated by XB0, XB1, and XB2. Here, XB0 corresponds to the standard value X mentioned later. Further, the difference between the displacement XB0 at the time of normal operation and XB1 of T90 at the retarded side is indicated by $\Delta XB1$, and the difference between the displacement XB0 at the time of normal operation and XB2 of T90 at the advanced side is indicated by ΔXB2. FIG. 6b shows T90 as the time required for rotation by a crank angle of 90°, but cases where the times T120, T180, T360, etc. required for rotation by a crank angle of 120°, 180°, 360°, etc. are employed are also deemed to be included within the scope of the present invention. When T90 is employed as the indicator of the state of combustion, the indicator Xfn at step 101 of FIG. 5 corresponds to XB1 and XB2 in FIG. 6b. Further, the indicator Xsn where the valve opening characteristic at step 104 mentioned later is changed also corresponds to XB1 and XB2 in FIG. 6b.

Figure 7A:
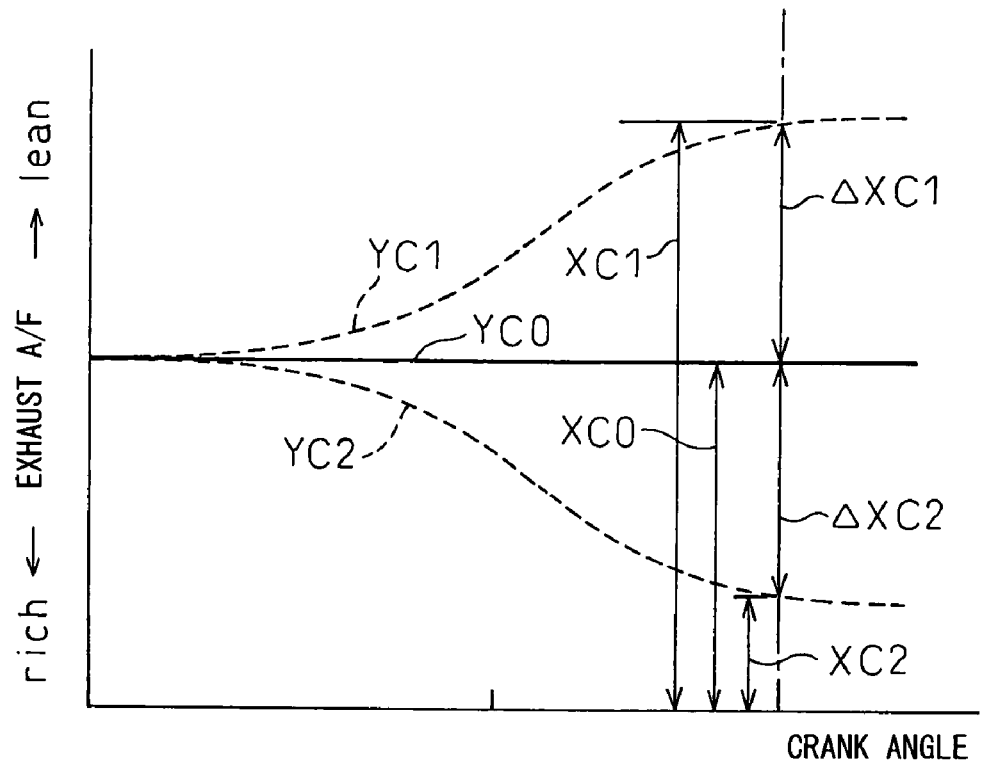
FIG. 7a is a view for explaining an example of an indicator of the state of combustion in the present invention and shows an exhaust air/fuel ratio.

Next, an explanation will be given of the case where the air/fuel ratio A/F is employed as the indicator of the state of combustion by using FIG. 7a. For the air/fuel ratio, in the present embodiment, two air/fuel ratio sensors 58a and 58b are provided in the exhaust system as mentioned above, therefore the air/fuel ratio in each cylinder can be found by analyzing the change along with time of the air/fuel ratio detected by them by the relationship with the crank angle. Note that, it is also possible to provide air/fuel ratio sensors in the exhaust passageways 41, 42, 43, and 44 for each cylinder and find the air/fuel ratio for each cylinder by those. In FIG. 7a, the ordinate indicates the air/fuel ratio A/F, and the abscissa indicates the crank angle. A solid line YC0 shown in FIG. 7a indicates the air/fuel ratio A/F in normal operation, while the two dotted lines YC1 and YC2 indicate the air/fuel ratios A/F when deviated to the lean side and rich side from the time of normal operation. As shown in FIG. 7a, the air/fuel ratios A/F at certain crank angles of the solid line YC0 and the dotted lines YC1 and YC2 are indicated by XC0, XC1, and XC2. Here, XC0 corresponds to the standard value X mentioned later. Further, the difference between the air/fuel ratio XC0 at the time of normal operation and the air/fuel ratio XC1 when at the rich side is indicated by ΔXC1, and the difference between the air/fuel ratio XC0 at the time of normal operation and the air/fuel ratio XC2 when at the lean side is indicated by ΔXC2. When the air/fuel ratio is employed as the indicator of the state of combustion, the indicator Xfn at step 101 of FIG. 5 corresponds to XC1 and XC2 in FIG. 7a. Further, the indicator Xsn where the valve opening characteristic at step 104 mentioned later is changed also corresponds to XC1 and XC2 shown in FIG. 7a.

Figure 7B:
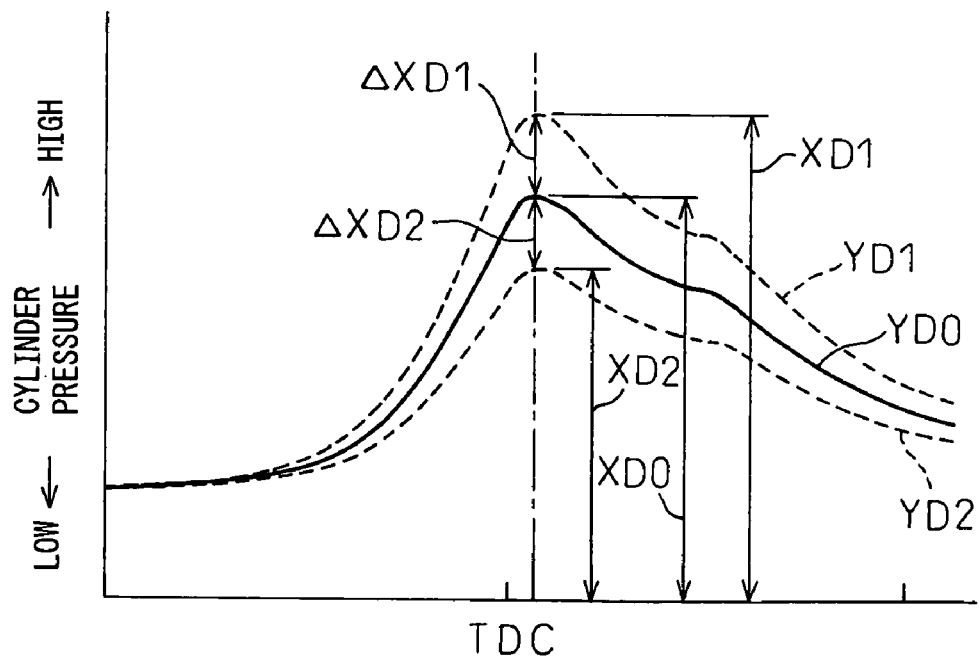
FIG. 7b is a view for explaining an example of an indicator of the state of combustion in the present invention and shows pressure in the cylinder.

In the same way as above, an explanation will be given of the case where the cylinder pressure is employed as the indicator of the state of combustion by using FIG. 7b. In FIG. 7b, the ordinate indicates the cylinder pressure, and the abscissa indicates the crank angle. The solid line YD0 shown in FIG. 7b indicates the cylinder pressure at normal operation, while the two dotted lines YD1 and YD2 indicate the cylinder pressures where deviated from that at the time of normal operation to the high pressure side and the low pressure side. As shown in FIG. 7b, the cylinder pressures where the maximum pressures (combustion pressures) are given in the cylinders at the solid line YD0 and the dotted lines YD1 and YD2 are indicated by XD0, XD1, and XD2. Here, XD0 corresponds to the standard value X mentioned later. Further, the difference between the cylinder pressure XD0 at the time of normal operation and the cylinder pressure XD1 when at the high pressure side is indicated by ΔXD1, and the difference between the cylinder pressure XD0 at the time of normal operation and the cylinder pressure XD2 when at the low pressure side is indicated by ΔXD2. When the cylinder pressure is employed as the indicator of the state of combustion, the indicator Xfn at step 101 of FIG. 5 corresponds to XD1 and XD2 in FIG. 7b. Further, the indicator Xsn at step 104 mentioned later also corresponds to XD1 and XD2 in FIG. 7b when the valve opening characteristic is changed.

In this way, in the present invention, as the indicator of the state of combustion, the fluctuation of the engine speed, T90, air/fuel ratio, and cylinder pressure (combustion pressure) can be employed. By this, the existence of variation of the valve opening characteristic can be correctly detected with a relatively simple configuration as will be mentioned later. Further, it is also possible to simultaneously detect a plurality of indicators among them and use them as indicators of the state of combustion.

Figure 8A:
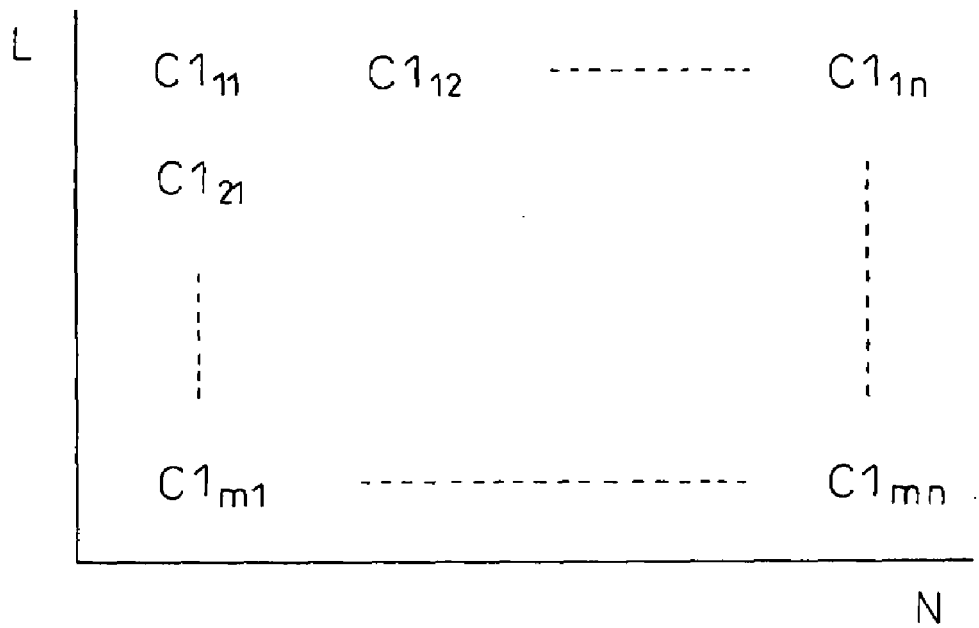
FIG. 8a is a view of a map of a predetermined value C1.

When the indicator Xfn of the state of combustion as described above at the first valve opening characteristic is detected for each cylinder at step 101 shown in FIG. 5, the routine proceeds to step 102. At step 102, an absolute value of the difference between the indicator Xfn obtained at step 101 and the standard value Xfr previously determined for the indicator (in more detail, the magnitude of the difference from the previously determined standard value) is calculated, and it is judged whether or not this absolute value of the difference is larger than a predetermined value C1. This standard value Xfr is a normal value or target value in each drive state for the indicator of the state of combustion found in advance by experiments etc., formed into a map, and stored in the ECU 27. Namely, the system is configured so that the standard value Xfr of the indicator of the state of combustion at that time is obtained from for example the engine speed and the opening degree of the accelerator. Further, the predetermined value C1 at step 101 is a value larger than zero. FIG. 8a is a view of a map of the predetermined value C1. As shown in FIG. 8a, the predetermined value C1 is stored in the ECU 27 in the form of a map as a function of the load L and the engine speed N. Other measurement values mentioned later are formed into maps and stored in the ECU 27 in the same way as above. In the ECU 27, when it is judged that the absolute value of the difference between the indicator Xfn and the standard value Xfr (|Xfn−Xfr|) is larger than the predetermined value C1, the routine proceeds to step 103, while when it is judged that the absolute value of this difference (|Xfn−Xfr|) is smaller than the predetermined value C1, the routine proceeds to step 104. Note that the predetermined standard value Xfr may be an average value Xfavg (=ΣXfn/n) from the indicator Xf1 to Xf4 as well.

At step 103, the difference between the indicator Xfn obtained at step 101 and the standard value Xfr previously determined for the indicator (in more detail, the magnitude of the difference from the previously determined standard value) ΔXfn is calculated for each cylinder. This standard value Xfr is the normal value or the target value in each drive state for the indicator of the state of combustion. It is found in advance by experiments etc., formed into a map, and stored in the ECU 27. Namely, the system is configured so that the standard value Xfr of the indicator of the state of combustion is obtained from for example the engine speed and the opening degree of the accelerator. By step 103, the differences ΔXfn (that is, the deviation for each cylinder) between the indicators Xfn of the states of combustion of the cylinders (first to fourth cylinders) and the standard value Xfr (that is, ΔXf1=Xf1−XFr, ΔXf2=Xf2−Xfr, ΔXf3=Xf3−Xfr, ΔXf4=Xf4−Xfr) are obtained. The indicator Xfn at the time of the first valve opening characteristic represents the influence of the variation of the fuel injection amount as will be mentioned later, therefore, by calculating the deviation ΔXfn from the standard value Xfr, the variation of the fuel injection amount is learned.

In the present embodiment, in FIG. 6a to FIG. 7b, the value at the time of normal operation, for example, XA0, corresponds to the standard value Xfr. Further, the difference, for example, ΔXA1 between this XA0 and the value in each cylinder, for example XA1, is calculated as the deviation ΔXfn. Accordingly, ΔXA1 and ΔXA2 in FIG. 6a correspond to the deviation ΔXfn at step 103. In the same way as above, ΔXB1 and ΔXB2 in FIG. 6b, ΔXC1 and ΔXC2 in FIG. 7a, and ΔXD1 and ΔXD2 in FIG. 7b correspond to the deviation ΔXfn. Further, in FIG. 6a, FIG. 6b, FIG. 7a, and FIG. 7b, only two cylinders are shown, but in actuality, the same deviation is calculated also for the other cylinders, for example, in the case of four cylinders, the remaining two cylinders. Note that, in other embodiments, it is also possible to calculate an average value Xfavg (=ΣXfn/n) of the indicators Xfn obtained with respect to the cylinders and use the deviation between the average value Xfavg and each indicator Xfn (=Xfavg−Xfn) as the deviation ΔXfn or ΔXsn mentioned later.

Next, at step 104, the indicator Xsn of the state of combustion when the valve opening characteristic is made the second valve opening characteristic is detected for each cylinder. This is a control step similar to step 101 of the control routine of FIG. 5. In the control by the present control routine as well, at this second valve opening characteristic, the operating angle and/or amount of lift is made smaller than that at the time the first valve opening characteristic. Accordingly, at the time of the second valve opening characteristic, the intake amount becomes relatively small. Note that, in the case of an embodiment where only one of the operating angle and amount of lift is controlled by the valve opening characteristic control device, the amount of lift is made smaller than that at the time of the first valve opening characteristic.

Further, the intake amount and the rotation speed and the engine load when the valve opening characteristic is made the second valve opening characteristic at step 104 are made the same as those at the time when the valve opening characteristic was the first valve opening characteristic at step 101. Namely, if the valve opening characteristic control device 57 normally operates, the throttle valve 56 is controlled so that the intake amounts become the same at the time of the valve opening characteristics. Note that, naturally, the indicator Xsn of the state of combustion detected at step 104 is made the same type as the indicator Xfn of the state of combustion detected at step 101.

When the indicator Xsn of the state of combustion at the second valve opening characteristic is detected for each cylinder at step 104, the routine proceeds to step 105. At step 105, the difference (Xfn−Xfr) between the indicator Xfn and the standard value Xfr is found, then it is judged whether or not the absolute value of this difference |Xfn−Xfr| is larger than a predetermined value C1'. The predetermined value C1' at step 105 is a value larger than zero. In the same way as the case of the predetermined value C1 mentioned above, the predetermined value C1' is stored in the ECU 27 in the form of a map as a function of the load L and the engine speed N. Note that when the routine passes step 103, it is also possible to directly use the absolute value of the deviation ΔXfn. When it is judged at step 105 that the absolute value |Xfn−Xfr| is larger than the predetermined value C1', the routine proceeds to step 106, while when it is judged that the absolute value |Xfn−Xfr| is not larger than the predetermined value C1', the routine proceeds to step 107.

Here, an explanation will be given of the above judgment at step 105. When there is variation in the valve opening characteristic control device 57, that is, when there is variation in the valve opening characteristics, a difference occurs in the intake amount among cylinders. It is learned that the smaller the operating angle and amount of lift, the larger the influence thereof. On the other hand, the larger the operating angle and amount of lift, the smaller the influence upon the indicator due to the variation of the valve opening characteristics. Further, when the operating angle and the amount of lift are certain extents of value or more, it can be considered that the influence of the variation of the valve opening characteristics can be substantially ignored. For this reason, when the operating angle and amount of lift are relatively large, that is, when the influence with respect to the above indicator is detected at the time of the first valve opening characteristic, it can be judged that this cause is not variation of the valve opening characteristic control device 57, but due to a portion other than the valve opening characteristic control device 57, i.e., in the present invention, the variation of the fuel injection amount by the fuel injection system. Namely, when the absolute value |Xfn−Xfr| of the difference (Xfn−Xfr) between the indicator Xfn and the standard value Xfr is larger than a predetermined value C1' as at step 105, it can be judged that variation of the fuel injection amount had occurred. On the other hand, when the operating angle and the amount of lift are relatively small, that is, when the influence with respect to the above indicator occurs at the time of the second valve opening characteristic, this cause is not only the occurrence of variation of the valve opening characteristic by the valve opening characteristic control device 57, but also the intermixture of variation of the fuel injection amount by the fuel injection system which is a portion other than the valve opening characteristic control device 57.

Then, when the absolute value |Xfn−Xfr| of the difference (Xfn−Xfr) between the indicator Xfn and the standard value Xfr is larger than the predetermined value C1', the routine proceeds to step 106. At step 106, by subtracting the difference (Xfn−Xfr) between the indicator Xfn and the standard value Xfr from the indicator Xsn at the time of the second valve opening characteristic calculated at step 104, a new indicator Xsn' (=Xsn−(Xfn−Xfr)) for the second valve opening characteristic is calculated for each cylinder. For example, when the internal combustion engine is a four-cylinder type, four new indicators from Xs1' (=Xs1−(Xf1−Xfr)) to Xs4' (=Xs4−(Xf4−Xfr)) are calculated. Here, the difference (Xfn−Xfr) is not an absolute value, but in a state including positive and negative signs as it is. Accordingly, when the difference (Xfn−Xfr) is a positive value, the new indicator Xsn' becomes smaller than the original indicator Xsn, while when the difference (Xfn−Xfr) is a negative value, the new indicator Xsn' becomes larger than the original indicator Xsn. In this way, by correcting the amount of variation of the fuel injection amount (Xfn−Xfr=ΔXfn), a new indicator Xsn' not including the influence of the variation of the fuel injection amount can be calculated. Accordingly, the new indicator Xsn' will represent the influence by only the variation of the valve opening characteristic.

Figure 8B:
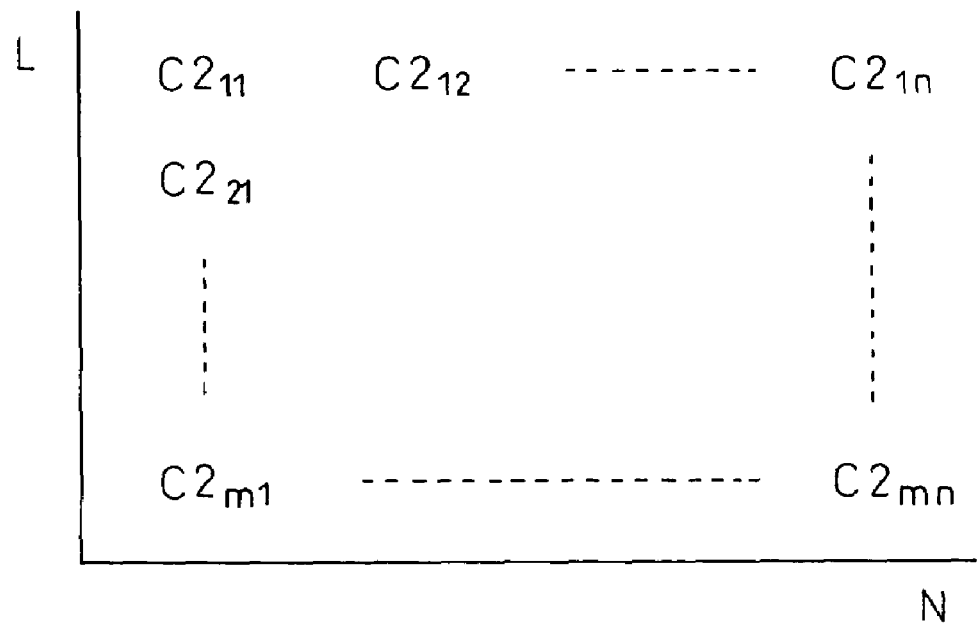
FIG. 8b is a view of a map of a predetermined value C2.

Next, at step 107, the absolute value of the difference between the indicator Xsn obtained at step 104 or the new indicator Xsn' obtained at step 106 and the standard value Xsr previously determined for these indicators (in more detail, the magnitude of the difference from the previously determined standard value) is calculated. Namely, when the new indicator Xsn' is not calculated (where NO is judged at step 105), the absolute value (|Xsn−Xsr|) of the difference between the indicator Xsn (Xs1 to Xs4 in the case of four cylinders) and the standard value Xsn is calculated. Then, where the new indicator Xsn' was calculated for each cylinder at step 106, the absolute value (|Xsn'−Xsr|) of the difference between the new indicator Xsn' (Xs1' to Xs4' in the case of four cylinders) and the standard value Xsn is calculated. This standard value Xsr is the normal value or target value for the indicator in each drive state in the same way as the standard value Xfr. Further, at step 107, it is judged whether or not the absolute value (|Xsn−Xsr| or |Xsn'−Xsr|) of these differences is larger than a predetermined value C2. The predetermined value C2 in the above step 107 is a value larger than zero. FIG. 8b is a view of a map of the predetermined value C2. As shown in FIG. 8b, the predetermined value C2 is stored in the ECU 27 in the form of a map as a function of the load L and the engine speed N. When it is judged at step 107 that the absolute value (|Xsn−Xsr| or |Xsn'−Xsr|) of the difference is larger than the predetermined value C2, the routine proceeds to step 108. On the other hand, when it is judged at step 107 that the absolute value of the difference mentioned above is not larger than the predetermined value, it is judged that there is no variation of the valve opening characteristic and the processing is ended. Note that, the predetermined standard value Xsr may be the average value Xsavg (=ΣXsn/n) from the indicators Xs1 to Xs4 as well.

At step 108, the difference ΔXsr between the indicator Xsn obtained at step 104 or the new indicator Xsn' obtained at step 106 and the standard value Xsr previously determined for these indicators (in more detail, the magnitude of the difference from the previously determined standard value) is calculated for each cylinder. This standard value Xsr is the normal value or target value for the indicator in each drive state in the same way as the above standard value Xfr. For example, if the relationship shown in FIG. 6a for the time of the second valve opening characteristic different from the case of the first valve opening characteristic mentioned above is obtained, the value at the time of normal operation, for example, XA0, corresponds to the standard value Xsr. Then, the difference, for example ΔXAL between this XA0 and the value in each cylinder, for example XA1, is calculated as the deviation ΔXsn. Accordingly, in this case, ΔXAL and ΔXA2 in FIG. 6a correspond to the deviation ΔXsn at step 108. In the same way as the above mentioned case, also ΔXB1 and ΔXB2 in FIG. 6b, ΔXC1 and ΔXC2 in FIG. 7a, and ΔXD1 and ΔXD2 in FIG. 7b can correspond to the deviation ΔXsn. By step 108, the differences ΔXsn (that is, ΔXs1=Xs1−Xsr, ΔXs2=Xs2−Xsr, ΔXs3=Xs3−Xsr, and ΔXs4=Xs4−Xsr, or ΔXs1=Xs1'−Xsr, ΔXs2=Xs2'−Xsr, ΔXs3=Xs3'−Xsr, and ΔXs4=Xs4'−Xsr) between indicators Xsn of the state of combustion of cylinders (first to fourth cylinders) or the new indicator Xsn' and the standard value Xsr (that is, the deviation for cylinder) is obtained, and the processing is ended. As mentioned above, in the indicator Xsn at the time of the second valve opening characteristic, the variation of the fuel injection amount and the variation of the valve opening characteristic can be mixed, but in the present invention, where there is variation of the fuel injection amount, this is corrected (the difference (Xfn−Xfr) is subtracted from the indicator Xsn), therefore, by calculating the deviation ΔXsn from the standard value Xsr, just the variation of the valve opening characteristic can be calculated.

Figure 9A:
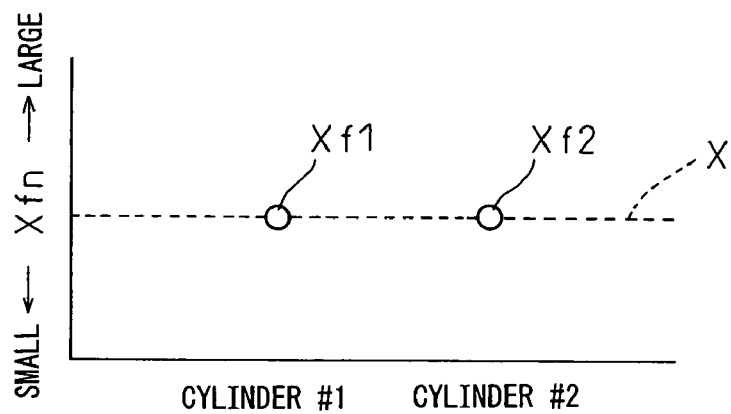
FIG. 9a is a view of an indicator Xfn at the time of a first valve opening characteristic.
Figure 9B:
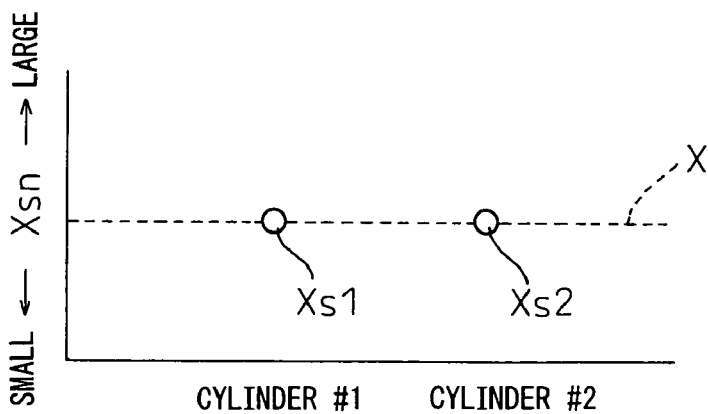
FIG. 9b is a view of an indicator Xsn at the time of a second valve opening characteristic.

FIG. 9a is a view of an indicator Xfn at the time of the first valve opening characteristic in any cylinder #1 and cylinder #2 in the internal combustion engine provided with four cylinders (#1 to #4) as an example. Further, FIG. 9b is a view of an indicator Xsn at the time of the second valve opening characteristic in any cylinder #1 and #2. Dotted lines X shown in these diagrams indicate standard values and correspond to XA0 in FIG. 6a, XB0 in FIG. 6b, XC0 in FIG. 7a, and XD0 in FIG. 7b. As shown in FIG. 9a, when the indicators Xfn at the time of the first valve opening characteristic in the cylinder #1 and the cylinder #2 are approximately equal or they are slightly deviated to an extent that does not exceed a predetermined value C1 although not illustrated, it is judged at step 102 of FIG. 5 that the absolute value (|Xfn−Xfr|) of the difference between the indicator Xfn and the standard value Xfr is not larger than the predetermined value C1 (NO judgment). Accordingly, in this case, the routine will proceed to step 104 without passing through step 103. Further, when the absolute value |Xfn−Xfr| of the difference (Xfn−Xfr) between the indicator Xfn and the standard value Xfr is not larger than the predetermined value C1', the amount of variation of the fuel injection amount is not corrected at step 106. Namely, it is judged that variation of the fuel injection amount does not occur. Further, as shown in FIG. 9b, when indicators Xsn at the time of the second valve opening characteristic in the cylinder #1 and the cylinder #2 are approximately equal or they are slightly deviated to an extent that does not exceed a predetermined value C2 although not illustrated, it is judged at step 107 that the absolute value (|Xsn−Xsr|) of the difference between the indicator Xsn and the standard value Xsr is not larger than the predetermined value C2 (NO judgment). That is, in this case, it is also judged that variation of the valve opening characteristic does not occur.

Figure 10A:
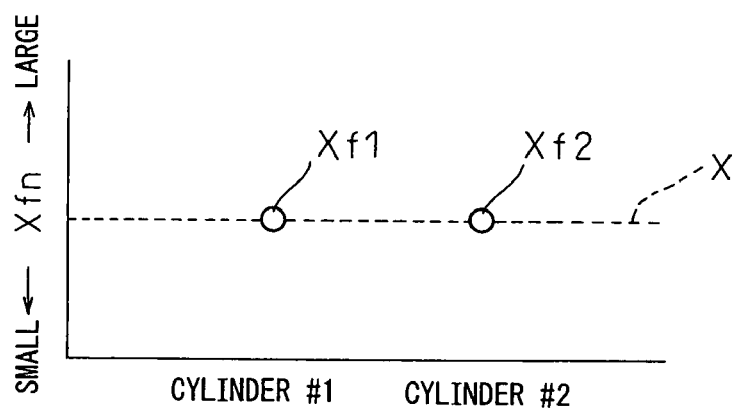
FIG. 10a is a view of an indicator Xfn at the time of the first valve opening characteristic in another case.
Figure 10B:
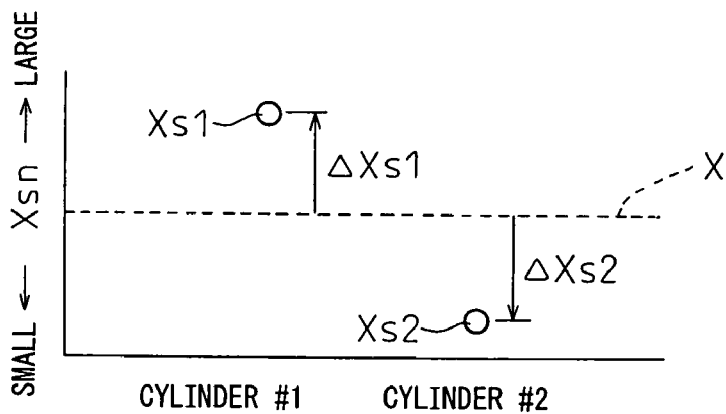
FIG. 10b is a view of an indicator Xsn at the time of the second valve opening characteristic in another case.

FIG. 10a and FIG. 10b are views the same as FIG. 9a and FIG. 9b showing indicators Xsn at times of the first valve opening characteristic and second valve opening characteristic in any cylinders #1 and #2 in other cases. The dotted lines X are as mentioned before. As shown in FIG. 10a, when the indicators Xfn at the time of the first valve opening characteristic in the cylinder #1 and the cylinder #2 are approximately equal or they are slightly deviated to an extent that does not exceed a predetermined value C1 although not illustrated, as mentioned above, it is judged NO at step 102 and the routine proceeds to step 104. Further, when the absolute value |Xfn−Xfr| of the difference (Xfn−Xfr) between the indicator Xfn and the standard value Xfr is not larger than the predetermined value C1', the amount of variation of the fuel injection amount is not corrected at step 106. Namely, it is judged that variation of the fuel injection amount does not occur. On the other hand, for the indicator Xsn at the time of the second valve opening characteristic, as shown in FIG. 10b, indicators Xs1 and Xs2 are deviated from the standard line X in opposite directions to each other. In such a case, at step 107 of the program 100 shown in FIG. 5, it may be judged that the absolute value (|Xsn−Xsr|) of the difference between the indicator Xsn and the standard value Xsr is larger than a predetermined value C2 (YES judgment). Then, at step 108, the deviation ΔXsn (ΔXs1 and ΔXs2) is calculated. That is, in this case, it is judged that only variation of the valve opening characteristic occurs.

At step 102 of the program 100 of FIG. 5, when it is judged that the absolute value (|Xfn−Xfr|) of the difference between the indicator Xfn at the time of the first valve opening characteristic and the standard value Xfr is larger than the predetermined value C1 (YES judgment), the patterns can be classified to at least three types. FIG. 11 is a flowchart for explaining further the three patterns when it is judged YES at step 102 of FIG. 5. Accordingly, an explanation will be given of these three patterns by referring to FIG. 11.

First, at step 201 shown in FIG. 11, it is judged whether or not the positive and negative signs of the deviation ΔXfn calculated at step 103 of FIG. 5 and the positive and negative signs of the deviation ΔXsn calculated at step 108 are equal. When the signs of these deviation ΔXfn and deviation ΔXsn are equal, the routine proceeds to step 202. At step 202, it is judged whether or not the absolute value |ΔXfn| of the deviation ΔXfn and the absolute value |ΔXsn| of the deviation ΔXsn are equal to each other, that is, whether or not |ΔXfn|=|ΔXsn|. Further, when it is judged at step 202 that |ΔXfn|=|ΔXsn|, the routine proceeds to step 203.

Figure 12A:
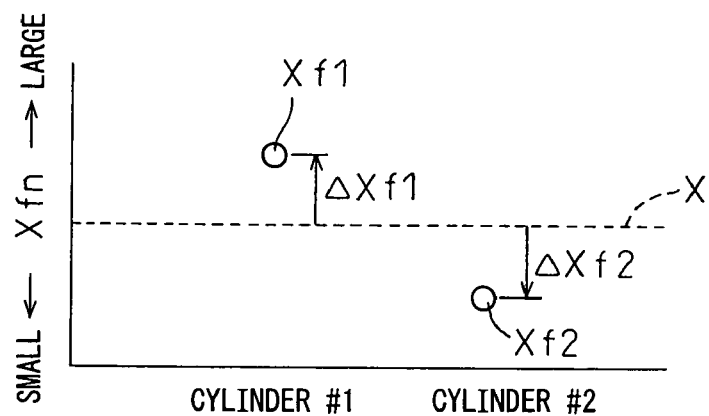
FIG. 12a is a view of an indicator Xfn when the routine proceeds to step 203 of FIG. 11.
Figure 12B:
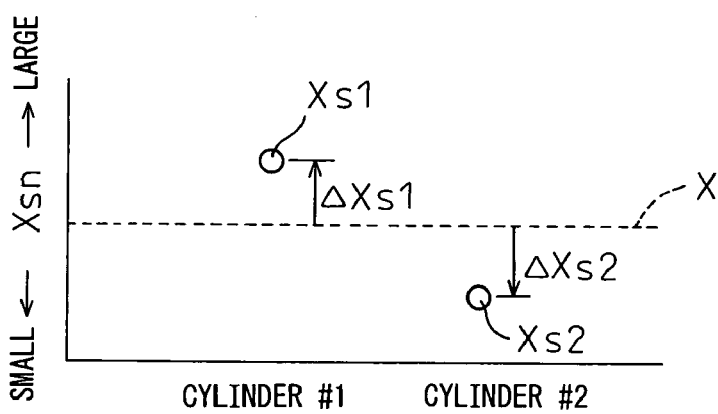
FIG. 12b is a view of an indicator Xsn when the routine proceeds to step 203 of FIG. 11.
Figure 12C:
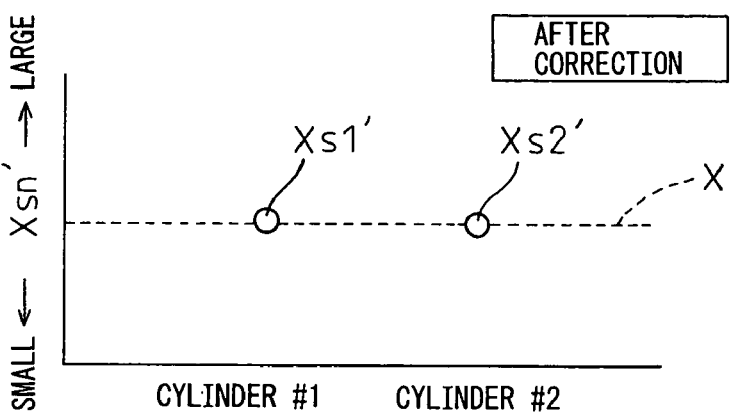
FIG. 12c is a view of a new indicator Xsn' when the routine proceeds to step 203 of FIG. 11.

FIG. 12*a* to FIG. 12*c* are views showing the indicator Xfn and the indicator Xsn when the routine proceeds to step 203 of FIG. 11 and the new indicator Xsn' after the correction. The indicators Xf1 and Xf2 at the time of the first valve opening characteristic shown in FIG. 12*a* are deviated from the standard value X in opposite directions to each other by exactly ΔXf1 and ΔXf2. On the other hand, as shown in FIG. 12*b*, the indicators Xs1 and Xs2 at the time of the second valve opening characteristic are also deviated from the standard value X in opposite directions to each other by exactly ΔXs1 and ΔXs2. Further, the deviation direction of ΔXs1 and ΔXs2 becomes equal to the deviation direction of ΔXf1 and ΔXf2 shown in FIG. 12*a*. Accordingly, it is judged YES at step 201. Further, as seen from FIG. 12*a* and FIG. 12*b*, the absolute value |ΔXf1| of ΔXf1 and the absolute value |ΔXs1| of ΔXs1 become equal and, at the same time, the absolute value |ΔXf2| of ΔXf2 and the absolute value |ΔXs2| of ΔXs2 become equal. Namely, |ΔXfn|=|ΔXsn| is established, so it is judged YES at step 202. Then, |ΔXfn|=|ΔXsn|stands, therefore, ΔXsn for the new indicator Xsn' obtained by the correction at step 106 of FIG. 5 becomes approximately zero as shown in FIG. 12*c*. Namely, in this case, before the correction (FIG. 12*b*), it looks like the deviation ΔXsn exists and variation of the valve opening characteristic exists, but by performing the above correction, it is seen that, in actuality, the deviation ΔXsn does not exist, and accordingly variation of the valve opening characteristic does not occur (refer to FIG. 12*c*).

Figure 13A:
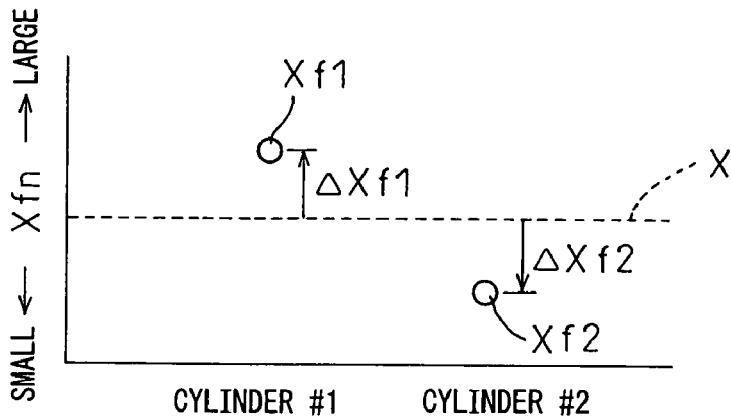
FIG. 13a is a view of an indicator Xfn when the routine proceeds to step 204 of FIG. 11.
Figure 13B:
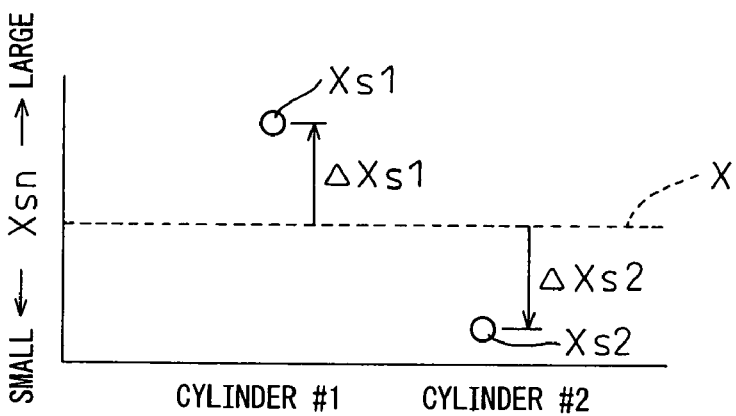
FIG. 13b is a view of an indicator Xsn when the routine proceeds to step 204 of FIG. 11.
Figure 13C:
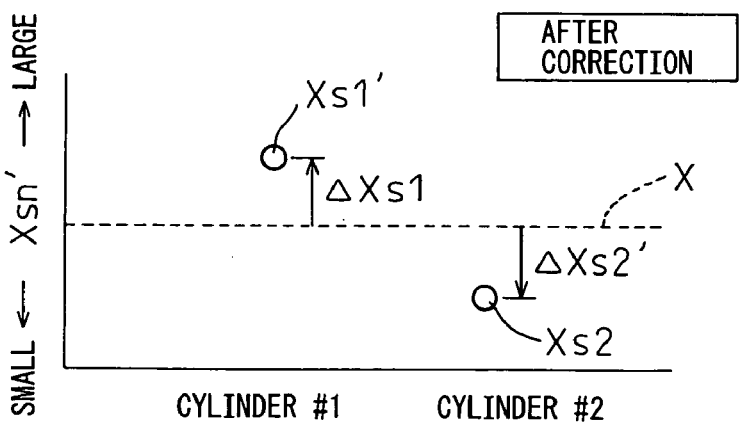
FIG. 13c is a view of a new indicator Xsn' when the routine proceeds to step 204 of FIG. 11.

Referring to FIG. 11 again, when it is judged at step 202 that the absolute value |ΔXfn| of the deviation ΔXfn and the absolute value |ΔXsn| of the deviation ΔXsn are not equal, that is |ΔXfn|≠|ΔXsn|, the routine proceeds to step 204. FIG. 13*a* to FIG. 13*c* are views showing the indicator Xfn and the indicator Xsn when the routine proceeds to step 204 and the new indicator Xsn' after the correction. FIG. 13*a* is substantially the same as FIG. 12*a*, so the explanation will be omitted. On the other hand, as shown in FIG. 13*b*, the indicators Xs1 and Xs2 at the time of the second valve opening characteristic are also deviated from the standard value X in opposite directions to each other by exactly ΔXs1 and ΔXs2, and the deviation directions of these ΔXs1 and ΔXs2 become equal to the deviation directions of ΔXf1 and ΔXf2 shown in FIG. 13*a*. Accordingly, it is judged YES at step 201.

As seen from FIG. 13*a* and FIG. 13*b*, however, the absolute value |ΔXs1| of ΔXs1 becomes larger than the absolute value |ΔXf1| of ΔXf1, and also the absolute value |ΔXs2| of ΔXs2 becomes larger than the absolute value |ΔXf2|of ΔXf2. Namely, in this case, |ΔXfn| becomes not equal to |ΔXsn|, and accordingly, it is judged NO at step 202. Then, in this case, when the new indicator Xsn' (=Xsn−(Xfn−Xfr)) is calculated by the correction at step 106 of FIG. 5, the new indicator Xsn' becomes as shown in FIG. 13*c*. Namely, the deviation direction of ΔXsn (FIG. 13*c*) based on the new indicator Xsn' after the correction becomes equal to the deviation direction of ΔXsn (FIG. 13*b*) before the correction, and the absolute value |ΔXsn| of ΔXsn after the correction becomes smaller than the absolute value |ΔXsn| of ΔXsn before the correction. Namely, in this case, the deviation ΔXsn becomes relatively large before the correction (FIG. 13*b*), accordingly the sum of the variation of the valve opening characteristic and the variation of the fuel injection amount looks relatively large, but it is seen that, in actuality, the new deviation ΔXsn after the correction becomes relatively small. Namely, in this case, it is seen most of the deviation ΔXsn before the correction is based on the variation of the fuel injection amount and that the variation of the valve opening characteristic per se is actually relatively small.

Figure 14A:
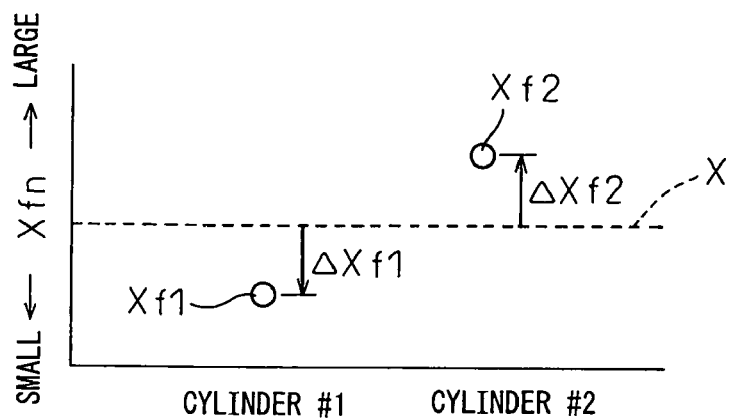
FIG. 14a is a view of an indicator Xfn in a certain case when the routine can proceed to step 205 of FIG. 11.
Figure 14B:
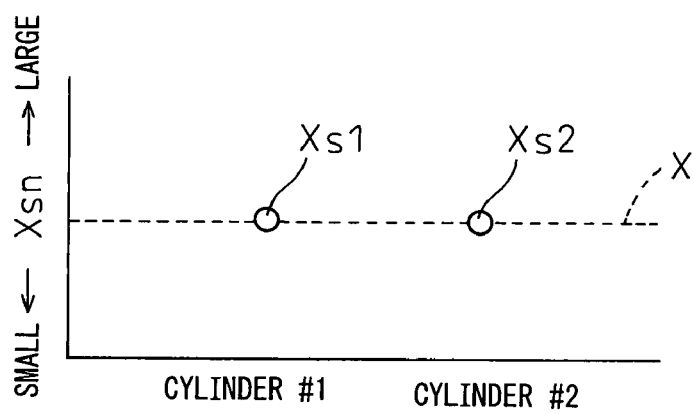
FIG. 14b is a view of an indicator Xsn in a certain case when the routine can proceed to step 205 of FIG. 11.
Figure 14C:
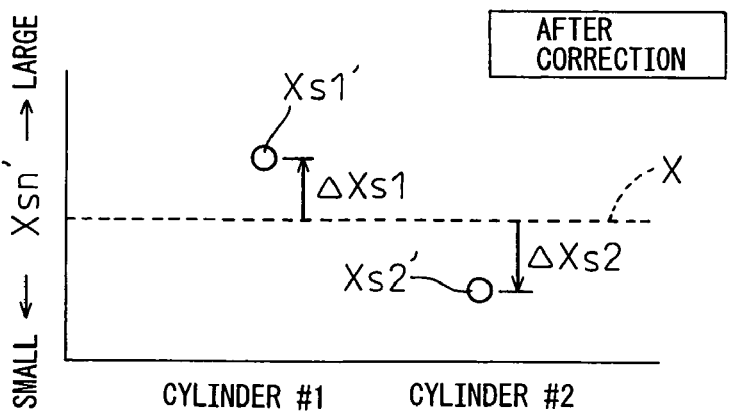
FIG. 14c is a view of an indicator Xsn' in a certain case when the routine can proceed to step 205 of FIG. 11.

Referring to FIG. 11 again, when it is judged at the above step 201 that the positive and negative signs of the deviation ΔXfn and the positive and negative signs of the deviation ΔXsn are not equal, the routine proceeds to step 205. FIG. 14*a* to FIG. 14*c* are views showing the indicator Xfn and the indicator Xsn of a certain case when the routine can proceed to step 205 and the new indicator Xsn' after the correction. As shown in FIG. 14*a*, the indicators Xf1 and Xf2 at the time of the first valve opening characteristic are deviated from the standard value X in opposite directions to each other by exactly ΔXf1 and ΔXf2. On the other hand, in FIG. 14*b*, the indicators Xs1 and Xs2 at the time of the second valve opening characteristic may not deviate from the standard value X or these indicators Xs1 and Xs2 may be slightly deviated in opposite directions to each other with respect to the deviation directions of ΔXf1 and ΔXf2 in FIG. 14*a*. Then, when the correction for the indicator Xsn at step 106 mentioned above is carried out, the new indicator Xsn' after the correction becomes as shown in FIG. 14*c*. Namely, the amount of variation of the fuel injection amount shown in FIG. 14*a* is corrected, therefore new indicators Xs1' and Xs2' after the correction are deviated from the standard value X by ΔXs1 and ΔXs2. Especially, in this case, as shown in FIG. 14*b*, no deviation of the indicator Xsn at the time of the second valve opening characteristic exists at first glance, so seemingly variation of the valve opening characteristic does not occur, but it is seen that the variation of the indicator Xsn, that is, the variation of the valve opening characteristic, actually occurred by performing the above correction.

Note that, in the above description, the explanation was given by taking as an example the case where the valve opening characteristic was changed to two different valve opening characteristics (first valve opening characteristic and second valve opening characteristic), but the present invention is not limited to this. It is also possible to change the valve opening characteristic to three or more different valve opening characteristics and detect the variation of the valve opening characteristic and the variation of the fuel injection amount based on the change of the difference of the deviation of the indicator and the standard value at that time.

In this way, in the present invention, not only the deviation at the time of the second valve opening characteristic, but also the deviation at the time of the first valve opening characteristic are considered. In this way, by calculating the deviation of each cylinder from indicators of the state of combustion at two different valve opening characteristics and correcting them by using these deviations, it becomes possible to correctly detect variation among cylinders. Especially, when the real measurement value of the deviation ΔXsn at the time of the second valve opening characteristic is near zero, there is a possibility that the variation of valve opening characteristics will not be detected, but in the present invention, in such case as well, it becomes possible to correctly detect occurrence of a variation of the valve opening characteristic. Further, naturally, suitable combinations of several of the above embodiments are also included in the scope of the present invention.

Figure 15:
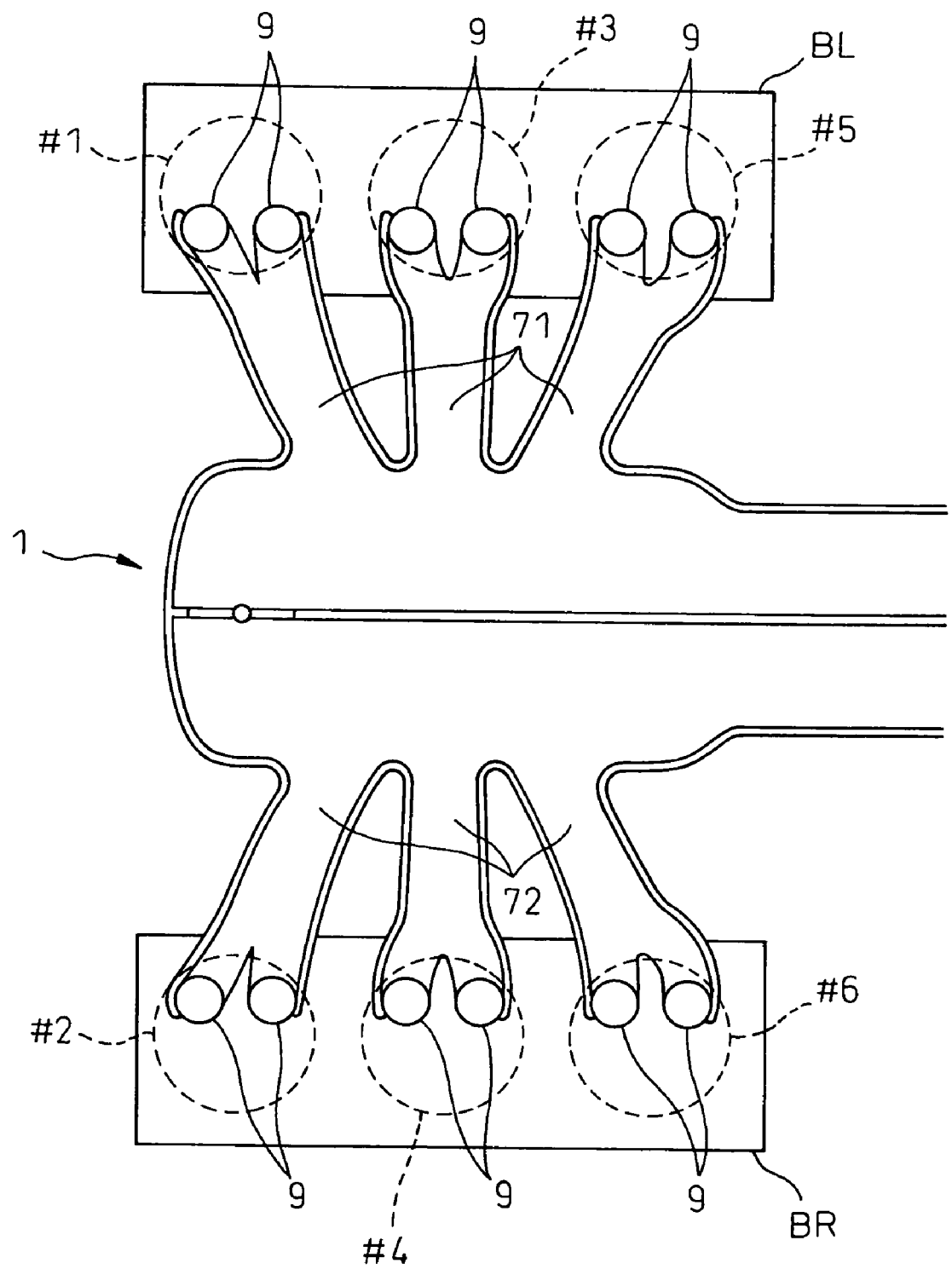
FIG. 15 is a lateral sectional view of an other spark-ignition type internal combustion engine having a valve opening characteristic control device of the present invention mounted thereon.

FIG. 15 is a lateral sectional view of another spark-ignition internal combustion engine having a valve opening characteristic control device of the present invention mounted thereon. As shown in FIG. 15, intake passageways of the internal combustion engine 1 are connected to intake manifolds 71 and 72 arranged at both sides of the intake passageway. Then, passageways of the intake manifold 71 are connected to the first cylinder #1, the third cylinder #3, and the fifth cylinder #5 arranged in a line in a left bank BL of the internal combustion engine 1. In the same way as above, passageways of the intake manifold 72 are connected to the second cylinder #2, the fourth cylinder #4, and the sixth cylinder #6 arranged in a line in a right bank BR of the internal combustion engine 1. That is, in the present invention, the odd number (uneven numbers, UN) cylinders are arranged at the left bank BL and, at the same time, the even number (EN) cylinders are arranged at the right bank BR. Note that, in FIG. 15, three cylinders are arranged in each bank, but the number of cylinders in the banks BL and BR may be different as well.

Figure 16:
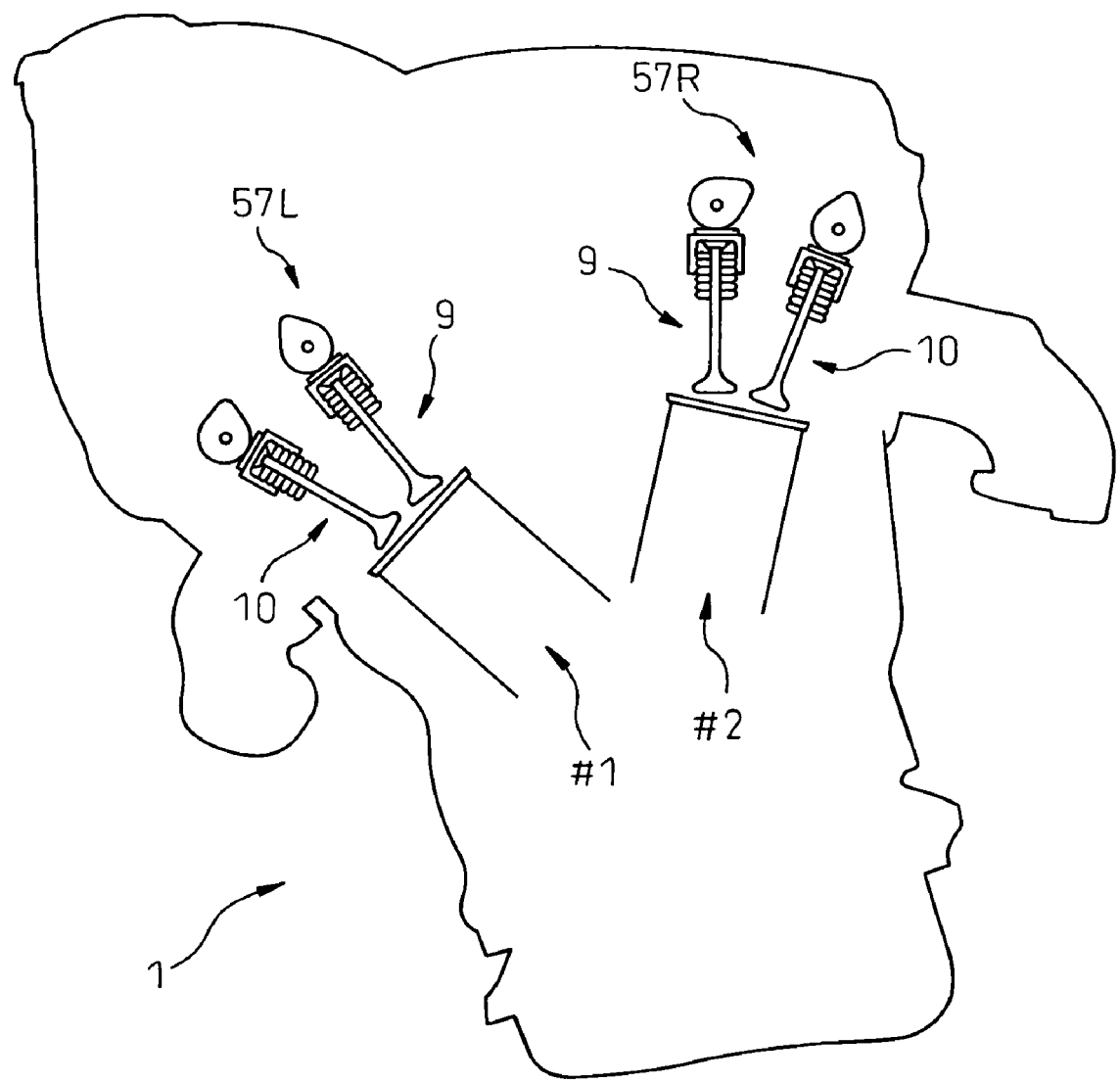
FIG. 16 is a vertical sectional view seen from the front surface of the internal combustion engine shown in FIG. 15.

FIG. 16 is a vertical sectional view seen from the front surface of the internal combustion engine shown in FIG. 15. As seen from FIG. 16, the internal combustion engine 1 in this case is a so-called V-type internal combustion engine in which the first cylinder #1 of the left bank BL and the second cylinder #2 of the right bank BR form a V-shape. Further, as shown in FIG. 16, a valve opening characteristic control device 57L for setting the valve opening characteristics of the intake valves of the cylinders #1, #3, and #5 of the left bank BL, and a valve opening characteristic control device 57R for setting the valve opening characteristics of the intake valves of the cylinders #2, #4, and #6 of the right bank BR are provided in the internal combustion engine 1. Here, the valve opening characteristic control devices 57L and 57R are the same as the valve opening characteristic control device 57 explained by referring to FIG. 3 and FIG. 4, so their explanations will be omitted.

Below, an explanation will be given of the detection of variation among banks in such a V-type internal combustion engine. FIG. 17 is a view of a flowchart of a program for the operation of the variation detection device of the internal combustion engine shown in FIG. 15 and FIG. 16. In the case of the normal operation where the intake amount becomes constant, the program 300 shown in FIG. 17 is executed by the ECU 27 at the time of the idling after for example warmup. In the program 300 shown in FIG. 17, step 301 to step 308 are the same as steps 101 to 108 of FIG. 5, so their explanations will be omitted. The deviation $\Delta Xsn$ calculated at step 308 includes the deviation $\Delta Xs1$ for the first cylinder #1, the deviation $\Delta Xs2$ for the second cylinder #2, the deviation $\Delta Xs3$ for the first cylinder #3, the deviation $\Delta Xs4$ for the first cylinder #4, the deviation $\Delta Xs5$ for the first cylinder #5, and the deviation $\Delta Xs6$ for the first cylinder #6. Further, at step 309, these deviations are averaged for each bank. Namely, at step 309, the average value avg$\Delta Xsn$ (UN) of the deviations $\Delta Xs1$, $\Delta Xs3$, and $\Delta Xs5$ for the left bank BL, that is, the odd number (UN) deviations $\Delta Xsn$(UN), is calculated and, at the same time, the average value avg$\Delta Xsn$ (EN) of deviations $\Delta Xs2$, $\Delta Xs4$, and $\Delta Xs6$ for the right bank BR, that is, the even number (EN) deviations $\Delta Xsn$(EN), is calculated. Then, the average value avg$\Delta Xsn$(UN) is made the deviation $\Delta XsL$ for the left bank BL and, at the same time, the average value avg$\Delta Xsn$(EN) is made the deviation $\Delta XsR$ for the right bank BR.

An explanation will be given of the situation of finding such deviation $\Delta XsL$ and deviation $\Delta XsR$ by referring to FIG. 18a and FIG. 18b. The ordinates in FIG. 18a and FIG. 18b indicate the indicator Xsn at the time of the second valve opening characteristic. Here the indicator Xsn' after the correction calculated at step 306 is shown. The abscissa in FIG. 18a indicates the first cylinder #1 to the sixth cylinder #6 of the internal combustion engine shown in FIG. 15 etc. Further, the abscissa in FIG. 18b indicates the left bank BL and the right bank BR. Note that, the dotted lines X shown in these figures indicate the standard value the same as the case of FIG. 9 etc.

Figure 18A:
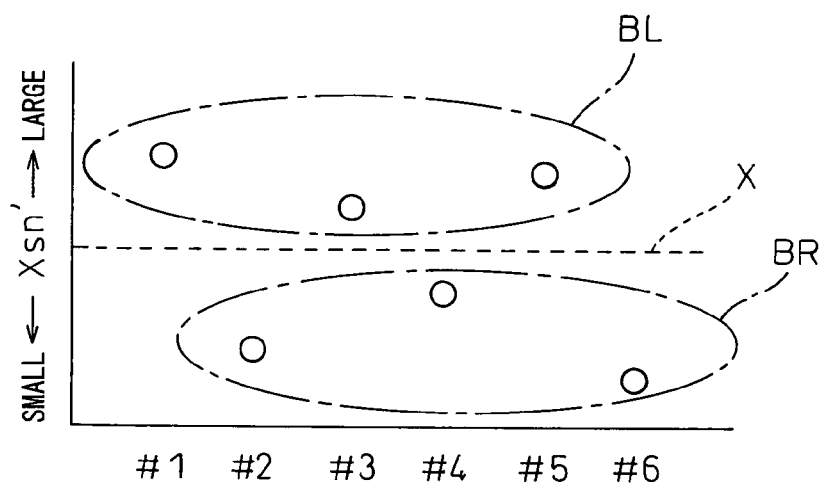
FIG. 18a is a view for explaining the situation of finding a deviation ΔXsL and a deviation ΔXsR.
Figure 18B:
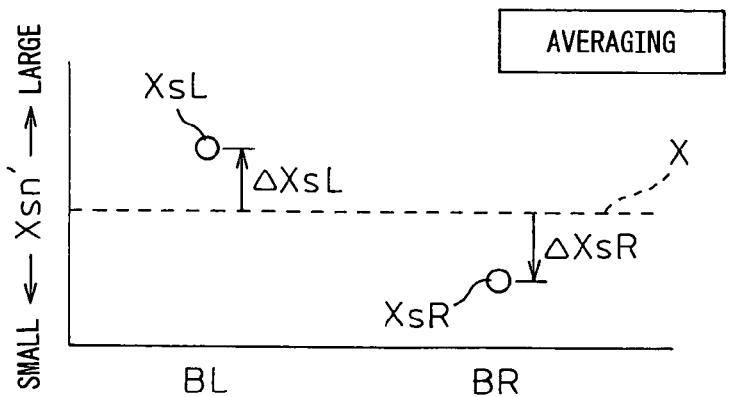
FIG. 18b is another view for explaining the situation of finding the deviation ΔXsL and the deviation ΔXsR.

Assume that deviations $\Delta Xsn$ calculated at step 308 of FIG. 17, that is, the deviation $\Delta Xs1$ to the deviation $\Delta Xs6$, are distributed as shown in for example FIG. 18a. That is, as seen from FIG. 18a, the deviations $\Delta Xs1$, $\Delta Xs3$, and $\Delta Xs5$ of the cylinders of the left bank BL are distributed so as to be generally higher than the standard value X. Contrary to this, the deviations $\Delta Xs2$, $\Delta Xs4$, and $\Delta Xs6$ of the cylinders of the right bank BR are distributed so as to be generally lower than the standard value X. Then, at step 309 of FIG. 17, when the deviation $\Delta XsL$ at the left bank BL and the deviation $\Delta XsR$ at the right bank BR are calculated by averaging the deviations in each bank, the positions of the deviation $\Delta XsL$ and the deviation $\Delta XsR$ are determined as shown in FIG. 18b. In this way, by averaging the deviations $\Delta Xsn$ of the cylinders in each bank, the deviation $\Delta XsL$ and the deviation $\Delta XsR$ for each bank are found. As mentioned above, the deviation $\Delta Xsn$ represents the variation of the valve opening characteristic of the intake valve 9, therefore, by calculating the deviation $\Delta XsL$ and the deviation $\Delta XsR$ for each bank, it becomes possible to judge the tendency of variation of the valve opening characteristic in each bank. That is, in the case shown in FIG. 18b, the variation of the valve opening characteristic at the left bank BL tends to be larger than the standard value X, and the variation of the valve opening characteristic at the right bank BR tends to be smaller than the standard value X. Especially, where the number of cylinders in each bank is large, it is not necessary to judge the variation of the valve opening characteristic for each cylinder, therefore it is advantageous to find the variation of the valve opening characteristic between banks.

Note that, in the program 300 of FIG. 17, after calculating the deviations $\Delta Xsn$ at step 308, these deviations $\Delta Xsn$ are averaged for each bank at step 309, but it is also possible to employ another method of finding the deviations $\Delta XsL$ and $\Delta XsR$ without finding the average. For example, it is also possible to calculate only the deviation concerning one cylinder among three cylinders at the left bank BL, for example, the third cylinder #3 located at the center of the bank and use the deviation $\Delta Xs3$ as the deviation $\Delta XsL$ at the left bank BL. Further, it is also possible to employ for example the value in the middle among deviations $\Delta Xs1$, $\Delta Xs3$, and $\Delta Xs5$ of the left bank BL (for example the deviation $\Delta Xs3$ in the case of $\Delta Xs1<\Delta Xs3<\Delta Xs5$) as the deviation $\Delta XsL$ for the left bank BL without finding the average. It is also possible to determine the deviation $\Delta XsR$ without finding the average in the same way as the above also for the right bank BR.

Figure 19:
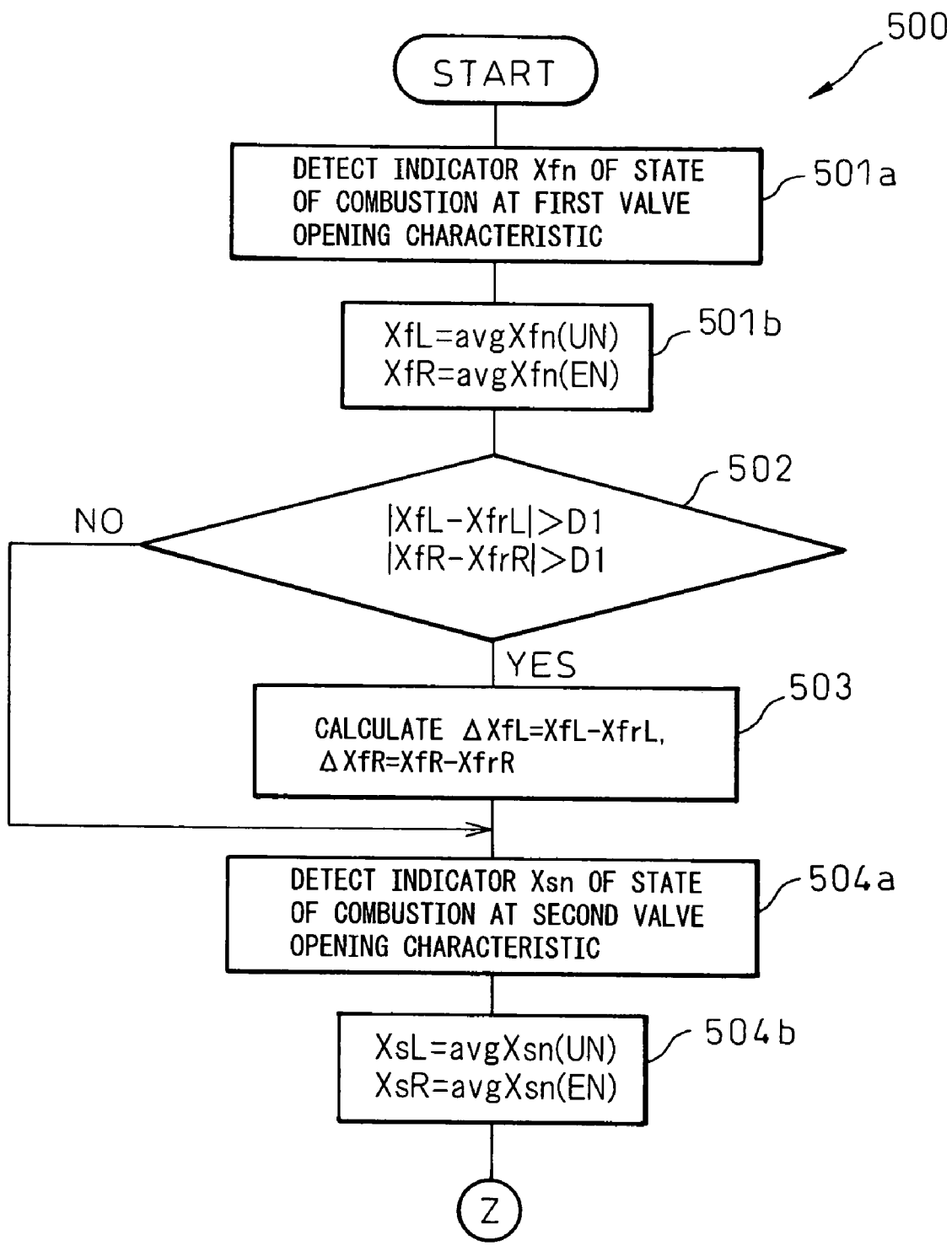
FIG. 19 is a view of another flowchart of a program for the operation of the variation detection device among banks of the internal combustion engine shown in FIG. 15 and FIG. 16.
Figure 20:
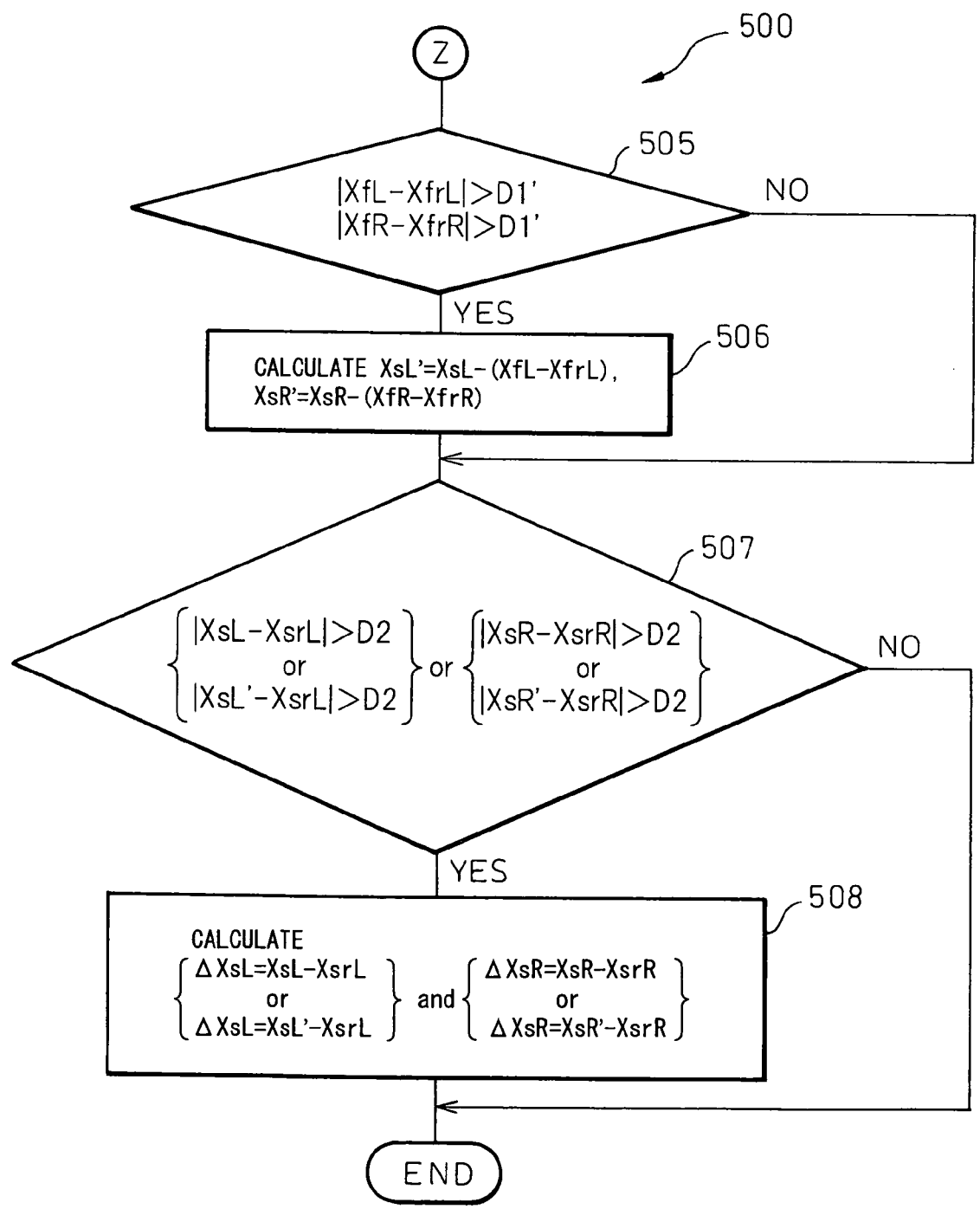
FIG. 20 is a view of still another flowchart of a program for the operation of the variation detection device among banks of the internal combustion engine shown in FIG. 15 and FIG. 16.

It is also possible to calculate the deviation $\Delta XsL$ at the left bank BL and the deviation $\Delta XsR$ at the right bank BR by a method other than the program 300 shown in FIG. 17. Both of FIG. 19 and FIG. 20 are views showing flowcharts of other programs for the operation of the variation detection device among banks of the internal combustion engine shown in FIG. 15 and FIG. 16. Program 500 shown in FIG. 19 and FIG. 20 is executed by the ECU 27 at the time of idling after for example warmup in the case of normal operation where the intake amount becomes constant. Below, an explanation will be given of other calculation methods for calculating the deviation ΔXsL and the deviation ΔXsR by referring to FIG. 19 and FIG. 20.

At step 501*a* of FIG. 19, in the same way as the case of the program 100, the indicator Xfn of the state of combustion in the first valve opening characteristic is detected for each cylinder. In this case, the internal combustion engine 1 shown in FIG. 15 includes six cylinders, that is, the first cylinder #1 to the sixth cylinder #6, therefore, the indicator Xf1 to the indicator Xf6 will be detected. Note that, in this first valve opening characteristic, the case where the operating angle and/or the amount of lift is relatively large and the case where the variation of the valve opening characteristic is small enough to ignore is selected. Accordingly, at the time of the first valve opening characteristic, the intake amount becomes relatively large. Note that, the case of an embodiment controlling only one of the operating angle and amount of lift by the valve opening characteristic control device is the case where the operating angle or amount of lift is relatively large. Further, indicators of the state of combustion at step 501 and step 504 mentioned later are the same as the case referring to FIG. 6*a*, FIG. 6*b*, FIG. 7*a*, and FIG. 7*b*, so the explanation will be omitted.

Next, the routine proceeds to step 501*b*, where the indicator Xf1 to the indicator Xf6 for the first cylinder #1 to the sixth cylinder #6 are averaged for the banks. As mentioned above, the first cylinder #1, the third cylinder #3, and the fifth cylinder #5 are arranged at the left bank BL, and the second cylinder #2, the fourth cylinder #4, and the sixth cylinder #6 are arranged at the right bank BR. Accordingly, at step 501*b*, first the average value avgXfn(UN) of the indicators Xf1, Xf3, and Xf5 for the left bank BL, that is the indicators Xfn(UN) of the odd number (UN) cylinders, is calculated and made the indicator XfL for the left bank BL. In the same way as above, the average value avgXfn(EN) of the indicators Xf2, Xf4, and Xf6 for the right bank BR, that is, the indicators Xfn(EN) of the even number (EN) cylinders, is calculated and made the indicator XfR for the right bank BR.

Note that after detecting the indicators Xfn at step 501*a*, these indicators Xfn are averaged for each bank at step 501*b*, but in the program 500 as well, another method of finding the indicators XfL and XfR without finding the average can be employed as well. For example, it is also possible to detect only the indicator of the state of combustion for any one cylinder among the three cylinders at the left bank BL, for example, the third cylinder #3 located at the center of the bank, and use this as the indicator XfL of the state of combustion of the left bank BL. Further, it is also possible to employ for example the middle value among the indicators Xf1, Xf3, and Xf5 of the left bank BL as the indicator XfL for the left bank BL without finding the average. The same is true also for the right bank BR.

When the indicator XfL for the left bank BL and the indicator XfR for the right bank BR are calculated, the routine proceeds to step 502. At step 502, the absolute values of differences between the indicators XfL and XfR obtained at step 501 and standard values XfrL and XfrR previously determined for these indicators (in more detail, the magnitude of the difference from the previously determined standard value) is calculated, and it is judged whether or not the absolute values of these differences are larger than a predetermined value D1. These standard values XfrL and XfrR are the normal values or target values in the drive states for indicators of the state of combustion. They are found in advance by experiments etc., formed into maps, and stored in the ECU 27. Namely, for example, the system is configured so that the standard values XfrL and XfrR of indicators of the state of combustion at that time are obtained from for example the engine speed and the opening degree of the accelerator. Further, the predetermined value D1 in the above step 502 is a value larger than zero. In the ECU 27, where it is judged that at least one of the absolute values (|XfL−XfrL|, |XfR−XfrR|) of the differences between the indicators XfL and XfR and standard values XfrL and XfrR is larger than the predetermined value D1, the routine proceeds to step 503, while when it is judged that the absolute values (|Xfn−XfrL|, |XfL−XfrR|) of these differences are not larger than the predetermined value D1, the routine proceeds to step 504*a*. Note that, it is also possible if the predetermined standard values XfrL and XfrR are the average values Xfavg (=ΣXfn/n) from the indicators Xf1 to Xf6.

At step 503, the differences ΔXfL and ΔXfR between the above indicators XfL and XfR obtained at step 501*b* and the standard values XfrL and XfrR previously determined for the indicators (in more detail, magnitudes of differences from previously determined standard values) (that is, ΔXfL=XfL−XfrL, ΔXfR=XfR−XfrR) are calculated for each bank. These standard values XfrL and XfrR are normal values or target values in drive states for indicators of the state of combustion. They are found in advance by experiments etc., formed into maps, and stored in the ECU 27. Namely, the system is configured so that the standard values XfrL and XfrR of indicators of the state of combustion at that time can be obtained from for example the engine speed and the opening degree of the accelerator. By step 503, the differences ΔXfL and ΔXfR between the indicators XfL and XfR of the state of combustion of the banks (left bank BL and right bank BR) and the standard values XfrL and XfrR (that is, deviations for each bank) are obtained. The indicators XfL and XfR at the time of the first valve opening characteristic represent the influence of the variation of the fuel injection amount in the same way as above Xfn, therefore, by calculating the deviations ΔXfL and ΔXfR from the standard values XfrL and XfrR, the variation of the fuel injection amount is learned.

In the present embodiment, in FIG. 6*a* to FIG. 7*b*, the value at the time of normal operation, for example, XA0, corresponds to the standard values XfrL and XfrR. Further, the difference, for example ΔXA1 between this XA0 and the value in each bank, for example XA1, is calculated as the deviations ΔXfL and ΔXfR. Accordingly, ΔXA1 and ΔXA2 in FIG. 6*a* can correspond to deviations ΔXfL and ΔXfR at step 503. In the same way as the above, ΔXB1 and ΔXB2 in FIG. 6*b*, ΔXC1 and ΔXC2 in FIG. 7*a*, and ΔXD1 and ΔXD2 in FIG. 7*b* can correspond to the deviations ΔXfL and ΔXfR.

Next, at step 504*a*, the indicator Xsn of the state of combustion when the valve opening characteristic is made the second valve opening characteristic is detected for each cylinder. In this case, the internal combustion engine 1 shown in FIG. 15 includes six cylinders, that is, the first cylinder #1 to the sixth cylinder #6, therefore, the indicator Xs1 to the indicator Xs6 are detected. In the control by the present control routine as well, at this second valve opening characteristic, the operating angle and/or amount of lift is made smaller than that at the time of the first valve opening characteristic. Accordingly, at the time of the second valve opening characteristic, the intake amount becomes relatively small. Note that, in the case of an embodiment controlling only one of the operating angle and the amount of lift by the valve opening characteristic control device, the operating angle or the amount of lift is made smaller than that at the time of the first valve opening characteristic.

Further, at step 504*a*, the intake amount, the rotation speed, and the engine load when the valve opening characteristic is made the second valve opening characteristic are made the same as those when the valve opening characteristic was the first valve opening characteristic at step 501. Namely, if the valve opening characteristic control devices 57L and 57R normally operate, the throttle valve 56 is controlled so that the intake amount becomes the same at the time of each valve opening characteristic. Note that, naturally, the indicator Xsn of the state of combustion detected at step 504*a* is made the same type as the indicator Xfn of the state of combustion detected at step 501.

Next, the routine proceeds to step 504*b*, where the indicator Xs1 to the indicator Xs6 for the first cylinder #1 to the sixth cylinder #6 are averaged for each bank. As mentioned above, the first cylinder #1, the third cylinder #3, and the fifth cylinder #5 are arranged at the left bank BL, and the second cylinder #2, the fourth cylinder #4, and the sixth cylinder #6 are arranged at the right bank BR. Accordingly, at step 504*b*, the average value avgXsn(UN) of the indicators Xs1, Xs3, and Xs5 for the left bank BL, that is the indicators Xsn(UN) of the odd number (UN) cylinders, is calculated, and this average value is made the indicator XsL for the left bank BL. In the same way as the above, the average value avgXsn(EN) of the indicators Xs2, Xs4, and Xs6 for the right bank BR, that is, the indicators Xsn(EN) of the even number (EN) cylinders, is calculated, and this average value is made the indicator XsR for the right bank BR.

Note that, for the indicators XfL and XfR, in the same way as the above case, it is also possible to find the indicators XsL and XsR without finding the average.

When the indicators XsL and XsR in the state of combustion at the second valve opening characteristic are detected for each bank at step 504*b*, the routine proceeds to step 505. At step 505, the differences (XfL−XfrL, XfR−XfrR) between the indicators XfL and XfR and the standard values XfrL and XfrR are found and it is judged whether or not the absolute values |XfL−XfrL| and |XfR−XfrR| of these differences are larger than a predetermined value D1'. The predetermined value D1' at step 505 is a value larger than zero. In the same way as the case of the predetermined value D1 mentioned above, the predetermined value D1' is stored in the ECU 27 in the form of a map as a function of the load L and engine speed N. Note that, when the routine passes step 503, it is also possible to directly use the absolute values of the deviations ΔXfL and ΔXfR. When it is judged at step 505 that at least one of the absolute values |XfL−XfrL| and |XfR−XfrR| is larger than the predetermined value D1', the routine proceeds to step 506, while when it is judged that the absolute values |XfL−XfrL| and |XfR−XfrR| are not larger than the predetermined value D1', the routine proceeds to step 507.

Here, an explanation will be given of the judgment at step 505 described above. When there is variation in the valve opening characteristic control devices 57L and 57R, that is, when there is variation in the valve opening characteristics, a difference arises in the intake amount between the banks. It is learned that the smaller the operating angle and amount of lift, the larger the influence. On the other hand, the larger the operating angle and amount of lift, the smaller the influence upon the indicators due to the variation of the valve opening characteristics. Further, when the operating angle and amount of lift are certain extents of values or more, it can be considered that the influence of the variation of the valve opening characteristics is substantially ignorable. For this reason, when the operating angle and amount of lift are relatively large, that is, when the influence with respect to the indicators mentioned above is detected at the time of the first valve opening characteristic, it can be decided that this cause is not variation of the valve opening characteristic control devices 57L and 57R, but a portion other than the valve opening characteristic control devices 57L and 57R, i.e., in the present invention, the variation of the fuel injection amount by the fuel injection system. Namely, when the absolute values |XfL−XfrL| and |XfR−XfrR| of differences (XfL−XfrL, XfR−XfrR) between the indicators XfL and XfR and standard values XfrL and XfrR are larger than the predetermined value D1' as at step 505, it can be judged that variation of the fuel injection amount occurs. On the other hand, when the operating angle and the amount of lift are relatively small, that is, where the influence with respect to the indicators mentioned above occurs at the time of the second valve opening characteristic, this cause is not only variation of the valve opening characteristic by the valve opening characteristic control devices 57L and 57R, but also the mixing of variation of the fuel injection amount by the fuel injection system which is a portion other than the valve opening characteristic control devices 57L and 57R.

Further, when at least one of the absolute values |XfL−XfrL| and |XfR−XfrR| of the differences (XfL−XfrL, XfR−XfrR) between the indicators XfL and XfR and their standard values XfrL and XfrR is larger than the predetermined value D1', the routine proceeds to step 506. At step 506, by subtracting the difference (XfL−XfrL) between the indicator XfL and the standard value XfrL from the indicator XsL for the left bank BL at the time of the second valve opening characteristic calculated at step 504*b*, a new indicator XsL' (=XsL−(XfL−XfrL)) for the second valve opening characteristic is calculated. In the same way as the above, by subtracting the difference (XfR−XfrR) between the indicator XfR and the standard value XfrR from the indicator XsR for the right bank BR, a new indicator XsR' (=XsR−(XfR−XfrR)) for the second valve opening characteristic is calculated. Here, the difference (XfL−XfrL) and the difference (XfR−XfrR) are not absolute values, but in states including the positive and negative signs as they are. Accordingly, when the difference (XfL−XfrL) and the difference (XfR−XfrR) are positive values, the new indicators XsL' and XsR' become smaller than the original indicators XsL and XsR, while when the difference (XfL−XfrL) and the difference (XfR−XfrR) are negative values, the new indicators XsL' and XsR' become larger than the original indicators XsL and XsR. In this way, by correcting the amounts of variation of the fuel injection amounts (XfL−XfrL=ΔXfL and XfR−XfrR=ΔXfR), new indicators XsL' and XsR' not including the influence of variation of the fuel injection amount can be calculated. Accordingly, the new indicator XsL' represents the influence of only the variation of the valve opening characteristic at the left bank BL, and the new indicator XsR' represents the influence of only the variation of the valve opening characteristic at the right bank BR.

Next, at step 507, the absolute values of the differences between the indicators XsL and XsR obtained at step 504*b* or the new indicators XsL' and XsR' obtained at step 506 and the standard values XsrL and XsrR previously determined for these indicators (in more detail, magnitudes of differences from the previously determined standard values) are calculated. Namely, when the new indicators XsL' and XsR' are not calculated (where it is judged NO at step 505), the absolute values (|XsL−XsrL|, |XsR−XsrR|) of differences between the indicators XsL and XsR and their standard values XsL and XsR are calculated. Further, when the new indicators XsL' and XsR' for the banks are calculated at step 506, the absolute values (|XsL'−XsrL|, |XsR'−XsrR|) of differences between the indicators XsL' and XsR' and their standard values XsrL and XsrR are calculated. These standard values XsrL and XsrR are normal values or target values for indicators in drive states in the same way as the standard values XfrL and XfrR. Further, it is judged at step 507 whether or not the absolute values (|XsL−XsrL| or |XsL'−XsrL| and |XsR−XsrR| or |XsR'−XsrR−) of these differences are larger than a predetermined value D2. The predetermined value D2 at step 507 is a value larger than zero. The predetermined value D2 is stored in the ECU 27 in the form of a map as a function of the load L and the engine speed N. At step 507, when it is judged that an absolute value (|XsL−XsrL| or |XsL'−XsrL| and |XsR−XsrR| or |XsR'−XsrR|) of differences is larger than the predetermined value D2, the routine proceeds to step 508. On the other hand, when it is judged at step 507 that the absolute values of the differences mentioned above are not larger than the predetermined value, it is judged that variation of valve opening characteristic does not exist, and the processing is ended. Note that, it is also possible if the predetermined standard values XsrL and XsrR are the average values Xsavg (=ΣXsn/n) of the indicator Xs1 to Xs6.

At step 508, the differences ΔXsL (=XsL−XsrL or =XsL'−XsrL) and ΔXsR(=XsR−XsrR or =XsR'−XsrR) between the indicators XsL and XsR obtained at step 504b or new indicators XsL' and XsR' obtained at step 506 and the standard values XsrL and XsrR previously determined for these indicators (in more detail, magnitudes of differences from the previously determined standard values) are calculated for each bank. These standard values XsrL and XsrR are normal values or target values for the indicators in the drive states in the same way as the above standard values XfrL and XsrR. For example, when the relationship shown in FIG. 6a for the time of the second valve opening characteristic different from the case of the first valve opening characteristic mentioned above is obtained, the value at the time of normal operation, for example, XA0, corresponds to the standard values XsrL and XsrR. Then, the difference, for example ΔXA1 between this XA0 and the value in each cylinder, for example XA1 is calculated as the deviations ΔXsL and ΔXsR. Accordingly, in this case, ΔXA1 and ΔXA2 in FIG. 6a can correspond to the deviations ΔXsL and ΔXsR at step 508. In the same way as the above case, ΔXB1 and ΔXB2 in FIG. 6b, ΔXC1 and ΔXC2 in FIG. 7a, and ΔXD1 and ΔXD2 in FIG. 7b can correspond to the deviations ΔXsL and ΔXsR. By step 508, the differences ΔXsL and ΔXsR between the indicators XsL and XsR of the state of combustion in the banks or new indicators XsL' and XsR' and the standard values XsrL and XsrR are obtained, and the processing is ended. As mentioned above, in the indicators XsL and XsR at the time of the second valve opening characteristic, the variation of the fuel injection amount and the variation of the valve opening characteristic may be mixed, but in the present invention, when variation of the fuel injection amount exists, this is corrected (the difference (XfL−XfrL) is subtracted from the indicators XsL and XsL' and, at the same time, the difference (XfR−XfrR) is subtracted from the indicators XsR and XsR'), therefore, by calculating the deviations ΔXsL and ΔXsR, just the variation of the valve opening characteristic can be calculated.

In this way, in the present invention, not only the deviation at the time of the second valve opening characteristic, but also the deviation at the time of the first valve opening characteristic are considered. In this way, by calculating the deviation in each bank from the indicators of the state of combustion at two different valve opening characteristics and performing correction by using these deviations, it becomes possible to correctly detect the inter-bank variation. Especially, when the real measurement value of the deviation ΔXsn at the time of the second valve opening characteristic is near zero, there was the possibility that the variation of the valve opening characteristic was not detected, but in the present invention, even in such case, it becomes possible to correctly detect existence of variation of the valve opening characteristic.

Note that, after the deviation ΔXsL at the left bank BL and the deviation ΔXsR at the right bank BR are calculated, preferably the valve opening characteristic control device 57L and the valve opening characteristic control device 57R for each bank (refer to FIG. 16) are adjusted so that these deviation ΔXsL and deviation ΔXsR are eliminated.

Figure 21:
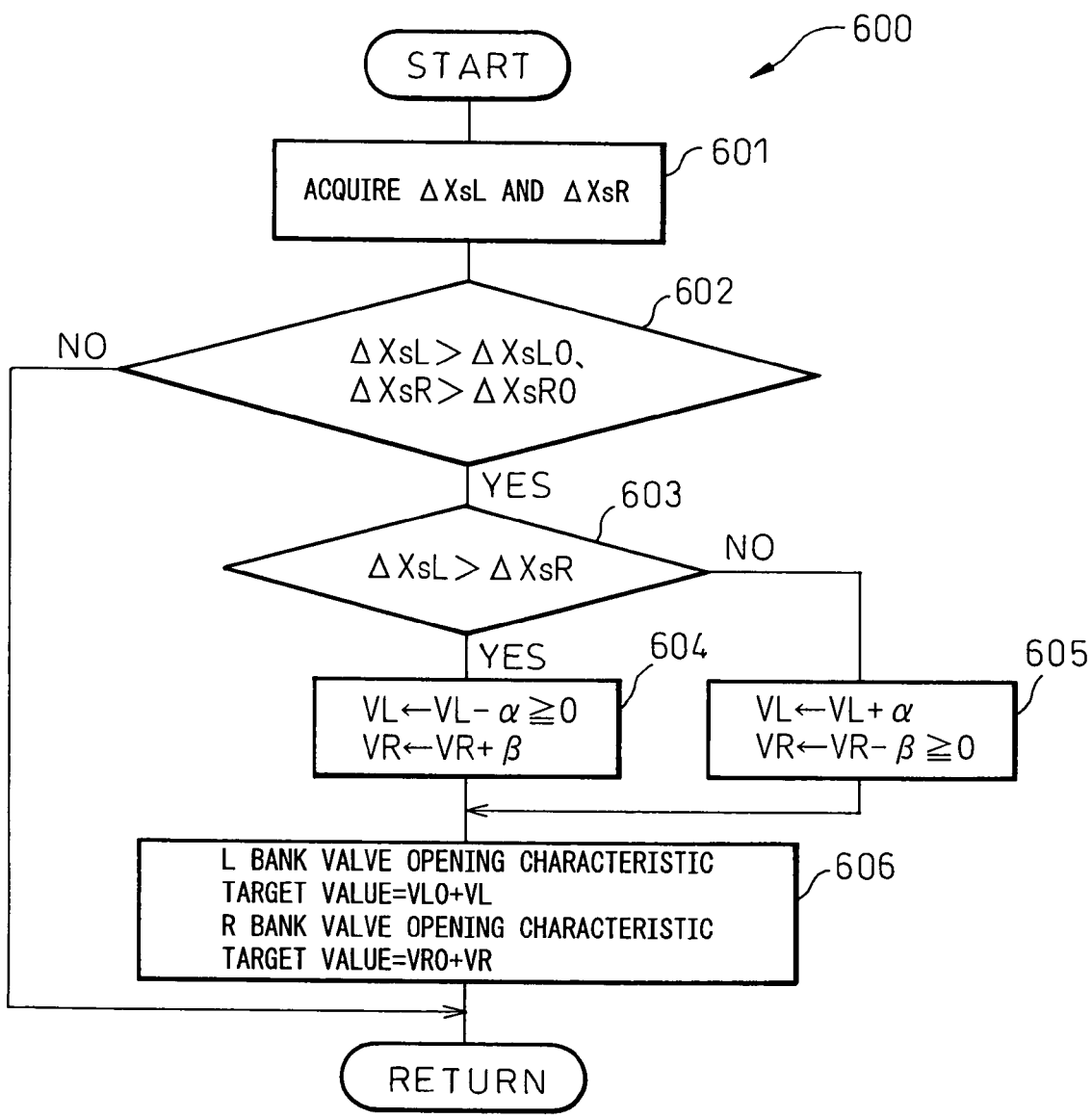
FIG. 21 is a view of a flowchart of a program for the operation performed for eliminating the variation among banks in the case of the internal combustion engine shown in FIG. 15 and FIG. 16.

FIG. 21 is a view of a flowchart of a program for the operation performed for eliminating the variation among banks in the case of the internal combustion engine shown in FIG. 15 and FIG. 16. Below, an explanation will be given of the elimination of the deviation ΔXsL and the deviation ΔXsR for the variation of the valve opening characteristic among banks by adjusting the valve opening characteristic control devices 57L and 57R by referring to FIG. 21. At step 601 of the program 600 shown in FIG. 21, both of the deviation ΔXsL of the left bank BL and the deviation ΔXsR of the right bank BR are acquired. Assume that these deviation ΔXsL and deviation ΔXsR are obtained from either of step 309 of the program 300 shown in FIG. 17 or step 508 of the program 500 shown in FIG. 19 and FIG. 20 and stored in the ECU 27. Accordingly, at step 601, these deviations ΔXsL and ΔXsR are acquired from the ECU 27.

Next, at step 602, it is judged whether or not the deviation ΔXsL is larger than the predetermined value ΔXsL0 and whether or not the deviation ΔXsR is larger than the predetermined value ΔXsR0. Assume that the predetermined values ΔXsL0 and ΔXsR0 are values previously determined by experiments etc. and near zero and are previously stored in the ROM or RAM of the ECU 27. When the deviation ΔXsL is not larger than the predetermined value ΔXsL0 and the deviation ΔXsR is not larger than the predetermined value ΔXsR0, it is decided that variation of the valve opening characteristic slightly exists, but to an ignorable extent and the processing is ended. On the other hand, when the deviation ΔXsL is larger than the predetermined value ΔXsL0 and/or the deviation ΔXsR is larger than the predetermined ΔXsR0, the routine proceeds to step 603. At step 603, it is judged whether or not the deviation ΔXsL of the left bank BL is larger than the deviation ΔXsR of the right bank BR. When the deviation ΔXsL is larger than the deviation ΔXsR, the routine proceeds to step 604, while when the deviation ΔXsL is smaller than the deviation ΔXsR, the routine proceeds to step 605.

At step 604, by subtracting a predetermined value α from the target valve opening characteristic correction learning value VL of the valve opening characteristic control device 57L for the intake valve 9 of a cylinder at the left bank BL, a new target valve opening characteristic correction learning value VL is obtained. Then, by adding a predetermined value β to the target valve opening characteristic correction learning value VR of the valve opening characteristic control device 57R for the intake valve of a cylinder at the right bank BR, a new target valve opening characteristic correction learning value VR is obtained. Assume that the predetermined values α and β are small values larger than zero and stored in the ECU 27 in advance. These predetermined values α and β may be values equal to each other too.

On the other hand, when the routine proceeds to step 605, conversely to the case of step 604, by adding the predetermined value α to the target valve opening characteristic correction learning value VL of the valve opening characteristic control device 57L at the left bank BL, the new target valve opening characteristic correction learning value VL is obtained. Further, by subtracting the predetermined value β from the target valve opening characteristic correction learning value VR of the valve opening characteristic control device 57R at the right bank BR, a new target valve opening characteristic correction learning value VR is obtained.

Note that the predetermined values α and β at step 604 and step 605 are values giving differences (VL−α, VR−β) between the target valve opening characteristic correction learning values VL and VR and these predetermined values of zero or more.

Next, at step 606, the new target valve opening characteristic correction learning value VL obtained at step 604 or step 605 is added to the previously determined base target value VL0, and the result is made the new valve opening characteristic target value for the valve opening characteristic control device 57L of the left bank BL. For the right bank BR as well, in the same way as the above, the new target valve opening characteristic correction learning value VR obtained at step 604 or step 605 is added to the previously determined base target value VR0, and the result is made the new valve opening characteristic target value for the valve opening characteristic control device 57R of the right bank BR. Then, the routine returns to step 601 again. This series of processing is repeatedly carried out to gradually make the target valve opening characteristic correction learning value VL and the target valve opening characteristic correction learning value VR approach equal values. As a result, the deviation ΔXsL of the left bank BL and the deviation ΔXsR of the right bank BR are eliminated, that is, the variation of the valve opening characteristics between the left bank BL and the right bank BR is eliminated. In this way, in the program 600, the valve opening characteristic is changed by exactly the amount of the variation of valve opening characteristics among cylinders detected so as not to include variation of the fuel injection amount, therefore more precise control becomes possible. By that, it becomes possible to avoid any adverse influence upon the drivability of the automobile mounting such internal combustion engine and the emission in the exhaust system.

Note that, in the program 600 shown in FIG. 21, by repeatedly subtracting and/or adding the small values α and β, the deviation ΔXsL and the deviation ΔXsR are eliminated. At step 604 and step 605, however, it is also possible to use the value of half of the difference between the deviation ΔXsL and the deviation ΔXsR (=(ΔXsL−ΔXsR)/2) as the predetermined values α and β. In this case, more than the case where the processing is repeatedly carried out by using the small values α and β, the target valve opening characteristic correction learning value VL and the target valve opening characteristic correction learning value VR are directly made equal, so it becomes possible to shorten the time required for eliminating the inter-bank variation.

The first cylinder #1 to the fourth cylinder #4 included in the internal combustion engine 1 shown in FIG. 1 and FIG. 2 are controlled in their valve opening characteristics by a single common valve opening characteristic control device 57, but sometimes an internal combustion engine is provided with a plurality of valve opening characteristic control devices 57 corresponding to the plurality of cylinders so that the valve opening characteristics for the intake valves of the cylinders can be individually controlled. In such internal combustion engine (not illustrated) as well, it is possible to perform the same control as that of the program 600 shown in FIG. 21.

Figure 22:
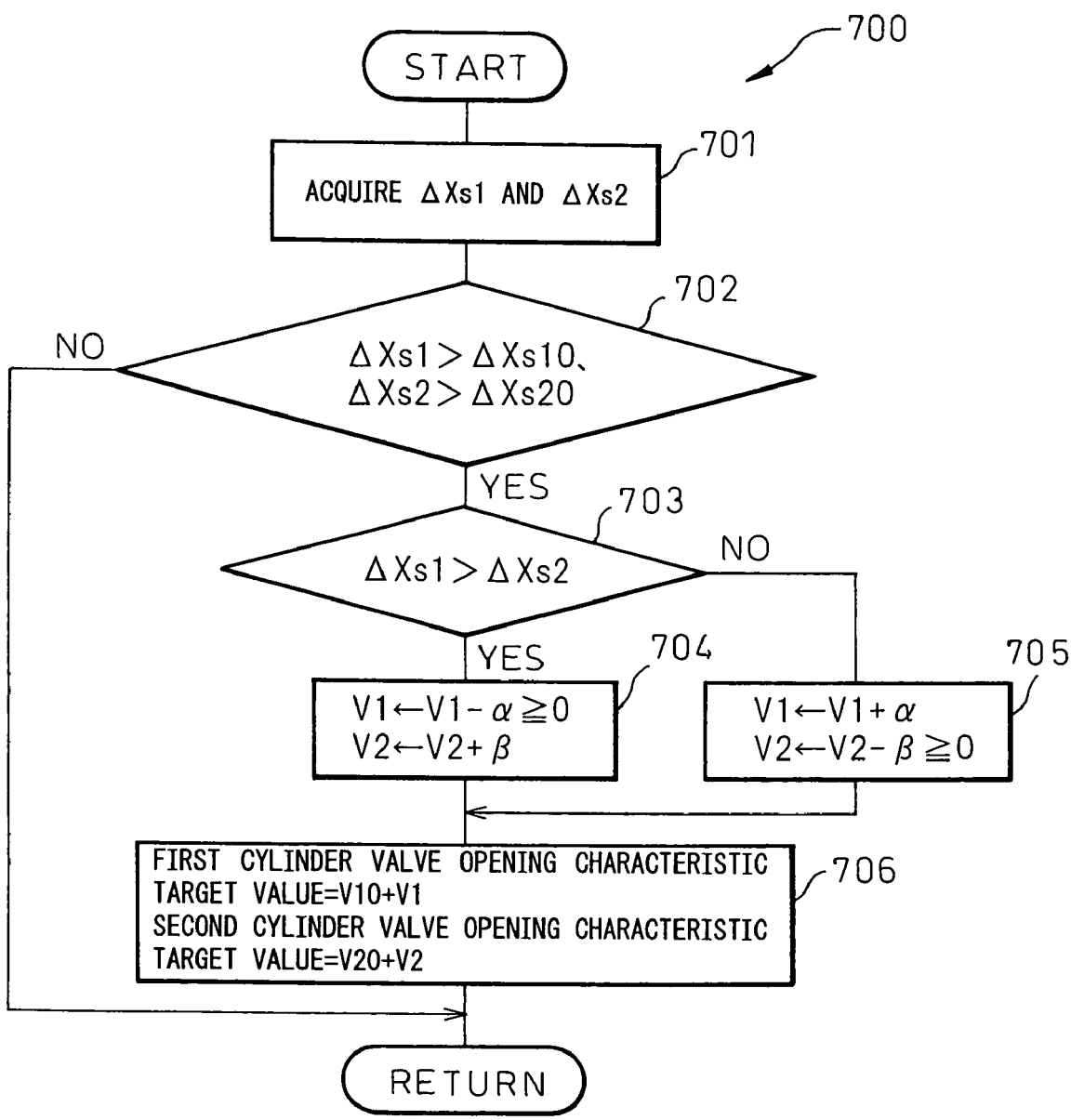
FIG. 22 is a view of a flowchart of a program for the operation performed for eliminating the inter-cylinder variation in the case of a four-cylinder internal combustion engine where a valve opening characteristic control device is provided for each cylinder.

Below, an explanation will be given of the control in for example a four-cylinder internal combustion engine provided with a valve opening characteristic control device for each cylinder. This not illustrated internal combustion engine is provided with four valve opening characteristic control devices 57(#1) to 57(#4) (not illustrated). These valve opening characteristic control devices 57(#1) to 57(#4) can control the valve opening characteristics of the first cylinder #1 to the fourth cylinder #4, respectively (all not illustrated). FIG. 22 is a view of a flowchart of the program for the operation performed for eliminating the inter-cylinder variation in the case of a four-cylinder internal combustion engine provided with a valve opening characteristic control device for each cylinder. In the program 700 shown in FIG. 22, the control for two cylinders among the four cylinders, i.e., the first cylinder #1 and the second cylinder #2, is carried out.

At step 701 of the program 700 shown in FIG. 22, the deviation ΔXs1 for the first cylinder #1 and the deviation ΔXs2 for the second cylinder #2 are acquired. These deviations ΔXs1 and ΔXs2 are found from step 108 of the program 100 shown in FIG. 5.

Then, at step 702, it is judged whether or not the deviation ΔXs1 is larger than a predetermined value ΔXs10 and whether or not the deviation ΔXs2 is larger than a predetermined value ΔXs20. Assume that the predetermined values ΔXs10 and ΔXs20 are values previously determined by experiments etc. and near zero and were previously stored in the ROM or RAM of the ECU 27. When the deviation ΔXs1 is not larger than the predetermined value ΔXs10 and the deviation ΔXs2 is not larger than the predetermined value ΔXs20, it is decided that slight variation of the valve opening characteristic exists, but to an ignorable extent, and the processing is ended. On the other hand, when the deviation ΔXs1 is larger than the predetermined value ΔXs10 and/or the deviation ΔXs2 is larger than the predetermined value ΔXs20, the routine proceeds to step 703. At step 703, it is judged whether or not the deviation ΔXs1 of the first cylinder #1 is larger than the deviation ΔXs2 of the second cylinder #2. When the deviation ΔXs1 is larger than the deviation ΔXs2, the routine proceeds to step 704, while when the deviation ΔXs1 is smaller than the deviation ΔXs2, the routine proceeds to step 705.

At step 704, by subtracting a predetermined value a from the target valve opening characteristic correction learning value V1 of the valve opening characteristic control device 57 (#1) for the intake valve 9 of the first cylinder #1, a new target valve opening characteristic correction learning value V1 is obtained. Then, by adding a predetermined value β to the target valve opening characteristic correction learning value V2 of the valve opening characteristic control device 57 (#2) for the intake valve of the first cylinder #2, a new target valve opening characteristic correction learning value V2 is obtained. Assume that the predetermined values α and β are small values larger than zero and were previously stored in the ECU 27. These predetermined values α and β may be values equal to each other as well.

On the other hand, when the routine proceeds to step 705, conversely to the case of step 704, by adding the predetermined value α to the target valve opening characteristic correction learning value V1 of the valve opening characteristic control device 57 (#1) in the first cylinder #1, a new target valve opening characteristic correction learning value V1 is obtained. Then, by subtracting the predetermined value β from the target valve opening characteristic correction learning value V2 of the valve opening characteristic control device 57 (#2) in the second cylinder #2, a new target valve opening characteristic correction learning value V2 is obtained.

Note that the predetermined values α and β at step 704 and step 705 are values giving differences (V1−α, V2−β) between the target valve opening characteristic correction learning values V1 and V2 and these predetermined values α and β of zero or more.

Next, at step 706, the new target valve opening characteristic correction learning value V1 obtained at step 704 or step 705 is added to the previously determined base target value V10, and the result is made the new valve opening characteristic target value for the valve opening characteristic control device 57 (#1) of the first cylinder #1. For the second cylinder #2 as well, in the same way as the above, the new target valve opening characteristic correction learning value V2 obtained at step 704 or step 705 is added to the previously determined base target value V20, and the result is made the new valve opening characteristic target value for the valve opening characteristic control device 57 (#2) of the second cylinder #2. Then, the routine returns to step 701 again. By repeatedly performing this series of processing, the target valve opening characteristic correction learning value V1 and the target valve opening characteristic correction learning value v2 gradually approach equal values. As a result, the deviation ΔXs1 of the first cylinder #1 and the deviation ΔXs2 of the second cylinder #2 are eliminated, that is, the variation of the valve opening characteristic between the first cylinder #1 and the second cylinder #2 is eliminated. Then, the same processing as that of the program 700 is carried out for the deviation ΔXs1 of the first cylinder #1 and the deviation ΔXs3 of the third cylinder. Then, the same processing as that of the program 700 is carried out also for the deviation ΔXs1 of the first cylinder #1 and the deviation ΔXs4 of the fourth cylinder #4. By this, the variation of valve opening characteristics among all cylinders of the internal combustion engine can be eliminated. In this way, in the program 700, the valve opening characteristic is changed by exactly the amount of the variation of the valve opening characteristic among cylinders detected so as not to include the variation of the fuel injection amount, therefore more precise control becomes possible. By that, it becomes possible to avoid any adverse influence upon the drivability of the automobile mounting such an internal combustion engine and the emission in the exhaust system.

Further, naturally, at step 704 and step 705, as the predetermined values α and β, it is also possible to use a value of half of the difference between the deviation ΔXs1 and the deviation ΔXs2 (=(ΔXs1−ΔXs2)/2).

Note that, in the present invention, the detailed explanation was given based on the specific embodiments, but a person skilled in the art can make various changes and corrections without deviation from the scope and concept of the present invention. Further, appropriate combinations of several of embodiments mentioned above are included in the scope of the present invention.

The invention claimed is:

1. An inter-cylinder variation detection device of an internal combustion engine comprising:
a valve opening characteristic setting means for changing an operating angle and/or amount of lift of an intake valve, wherein the valve opening characteristic setting means can set a first valve opening characteristic and a second valve opening characteristic having a smaller operating angle or amount of lift than that at the time of the first valve opening characteristic, and further
a calculating means for detecting an indicator of the state of combustion in each cylinder at the time of the first valve opening characteristic and the time of the second valve opening characteristic set by said valve opening characteristic setting means and, at the same time, calculating the deviation between these indicators and a standard value for each cylinder and
a detecting means for detecting the variation among cylinders by using the deviation for each cylinder at the time of the first valve opening characteristic and the deviation for each cylinder at the time of the second valve opening characteristic calculated by said calculating means.

2. An inter-cylinder variation detection device of an internal combustion engine as set forth in claim 1, wherein the variation of the fuel injection amount is detected by the deviation for each cylinder at the time of the first valve opening characteristic set by said valve opening characteristic setting means, and
the variation of the valve opening characteristic is detected by the deviation for each cylinder at the time of said second valve opening characteristic.

3. An inter-cylinder variation detection device of an internal combustion engine as set forth in claim 2, wherein when detecting the variation of the valve opening characteristic by the deviation for each cylinder at the time of the second valve opening characteristic set by said valve opening characteristic setting means, the amount of variation of the fuel injection amount for each cylinder detected at the time of the first valve opening characteristic is corrected.

4. An inter-cylinder variation detection device of an internal combustion engine as set forth in claim 1, wherein when detecting the variation among cylinders by said detection device, control is performed so that the drive conditions at times of the first and second valve opening characteristics set by said valve opening characteristic setting means become the same.

5. An inter-cylinder variation detection device of an internal combustion engine as set forth in claim 4, wherein said drive conditions are the rotational speed and torque.

6. An inter-cylinder variation detection device of an internal combustion engine as set forth in claim 4, wherein said detection device detects the variation among cylinders in an idling state of the internal combustion engine.

7. An inter-cylinder variation detection device of an internal combustion engine as set forth in claim 1, wherein said indicator of the state of combustion includes at least one of an air/fuel ratio, rotation fluctuation, and combustion pressure of the internal combustion engine.

8. An inter-cylinder variation detection device of an internal combustion engine as set forth in claim 1, wherein the valve opening characteristic of said intake valve is changed so that the variation among cylinders detected by said detecting means is eliminated.

9. An inter-cylinder variation detection device of an internal combustion engine comprising:
a valve opening characteristic setting means for changing an operating angle or amount of lift of an intake valve, wherein the valve opening characteristic setting means can set a first valve opening characteristic and a second valve opening characteristic having a smaller operating angle or amount of lift than that at the time of the first valve opening characteristic, and further a calculating means for detecting an indicator of the state of combustion in each cylinder at the time of the first valve opening characteristic and the time of the second valve opening characteristic set by said valve opening characteristic setting means and, at the same time, calculating the deviation between these indicators and an average value of the indicators of the state of combustion for the cylinders and a detecting means for detecting the variation among cylinders by using the deviation for each cylinder at the time of the first valve opening characteristic and the deviation for each cylinder at the time of the second valve opening characteristic calculated by said calculating means.

10. An inter-cylinder variation detection device of an internal combustion engine comprising:

a valve opening characteristic setting means for changing a valve opening characteristic of an intake valve;

an indicator detecting means for detecting indicators of the state of combustion for each cylinder at the time of a first valve opening characteristic and at the time of a second valve opening characteristic smaller than the first valve opening characteristic set by the valve opening characteristic setting means;

a fuel injection amount variation detecting means for detecting the variation of the fuel injection amount for each of the cylinders by using said indicator of the state of combustion detected by said indicator detecting means at the time of said first valve opening characteristic; and a valve opening characteristic variation detecting means for detecting variation of the valve opening characteristic for each of said cylinders by using said indicator of the state of combustion detected by said indicator detecting means at the time of said second valve opening characteristic and the variation of the fuel injection amount detected by said fuel injection amount variation detecting means.

11. An inter-cylinder variation detection device of an internal combustion engine as set forth in claim 10, wherein said valve opening characteristic setting means can change the valve opening characteristic of the intake valve for each cylinder, and the variation of the valve opening characteristic for each of said cylinders detected by said valve opening characteristic variation detecting means is eliminated by the valve opening characteristic of said intake valve for each of said cylinders being changed by said valve opening characteristic setting means.

12. An inter-cylinder variation detection device of an internal combustion engine as set forth in claim 10, wherein said indicator of the state of combustion includes at least one of the air/fuel ratio, the rotation fluctuation, and the combustion pressure of the internal combustion engine.

13. An inter-bank variation detection device of an internal combustion engine comprising:

a valve opening characteristic setting means for changing a valve opening characteristic of an intake valve for each bank;

an indicator detecting means for detecting indicators of the state of combustion for each cylinder at the time of a first valve opening characteristic and at the time of a second valve opening characteristic smaller than the first valve opening characteristic set by the valve opening characteristic setting means;

a fuel injection amount variation detecting means for detecting the variation of the fuel injection amount for each of said cylinders by using said indicator of the state of combustion detected by said indicator detecting means at the time of said first valve opening characteristic; and a valve opening characteristic variation detecting means for detecting the variation of the valve opening characteristic for each of said cylinders by using said indicator of the state of combustion detected by said indicator detecting means at the time of said second valve opening characteristic and the variation of the fuel injection amount detected by said fuel injection amount variation detecting means and finding the average of the variations of the valve opening characteristics for the cylinders for each bank to thereby detect the variation of the valve opening characteristic for each bank.

14. An inter-bank variation detection device of an internal combustion engine as set forth in claim 13, wherein the valve opening characteristic of said intake valve for each bank is changed by said valve opening characteristic setting means so that the variation of the valve opening characteristic of each bank detected by said valve opening characteristic variation detecting means is eliminated.

15. An inter-bank variation detection device of an internal combustion engine as set forth in claim 13, wherein said indicator of the state of combustion includes at least one of the air/fuel ratio, the rotation fluctuation, and the combustion pressure of the internal combustion engine.

16. An inter-bank variation detection device of an internal combustion engine provided with:

a valve opening characteristic setting means for changing a valve opening characteristic of an intake valve for each bank;

an indicator detecting means for detecting indicators of the state of combustion for each bank at the time of a first valve opening characteristic and at the time of a second valve opening characteristic smaller than the first valve opening characteristic set by the valve opening characteristic setting means;

a fuel injection amount variation detecting means for detecting the variation of the fuel injection amount for each bank by using said indicator of the state of combustion detected by said indicator detecting means at the time of said first valve opening characteristic; and a valve opening characteristic variation detecting means for detecting the variation of the valve opening characteristic for each bank by using said indicator of the state of combustion detected by said indicator detecting means at the time of said second valve opening characteristic and the variation of the fuel injection amount detected by said fuel injection amount variation detecting means.

* * * * *